US006982724B2

(12) United States Patent
Frisken et al.

(10) Patent No.: US 6,982,724 B2
(45) Date of Patent: Jan. 3, 2006

(54) METHOD FOR ANTIALIASING AN OBJECT REPRESENTED AS A TWO-DIMENSIONAL DISTANCE FIELD IN OBJECT-ORDER

(75) Inventors: Sarah F. Frisken, Cambridge, MA (US); Ronald N. Perry, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 163 days.

(21) Appl. No.: 10/396,861

(22) Filed: Mar. 25, 2003

(65) Prior Publication Data

US 2004/0189662 A1 Sep. 30, 2004

(51) Int. Cl.
*G09G 5/00* (2006.01)

(52) U.S. Cl. ..................................... 345/611; 345/613
(58) Field of Classification Search ................ 345/611, 345/613, 589; 382/199
See application file for complete search history.

(56) References Cited

U.S. PATENT DOCUMENTS

| 5,542,036 A | * | 7/1996 | Schroeder et al. | ........... 345/424 |
| 5,875,040 A | * | 2/1999 | Matraszek et al. | ........... 358/453 |
| 5,940,080 A | | 8/1999 | Ruehle et al. | ............... 345/432 |
| 5,982,387 A | * | 11/1999 | Hellmann | .................... 345/469 |
| 6,329,977 B1 | * | 12/2001 | McNamara et al. | ........ 345/589 |
| 6,377,262 B1 | * | 4/2002 | Hitchcock et al. | .......... 345/467 |

(Continued)

OTHER PUBLICATIONS

Frisken, S. et al., "Adaptively Sampled Distance Fields: A General Representation of Shape for Computer Graphics," SIGGRAPH 2000, pp 249–254.*

Jeng, E.K.–Y.; Xiang, Z.; "Fast Soft Shadow Visualization for Deformable Light Sources Using Adaptively Sampled Light Field Shadow Maps;" Proceedings of the 10th Pacific Conference on Computer Graphics and Applications (PG'02); 2002.* de Figueiredo, L.H.; Velho, L.; de Oliveira, J.B.; "Revisiting Adaptively Sampled Distance Fields," Computer Graphics and Image Processing, 2001 Proceedings of XIV Brazilian Symposium on , Oct. 15–18, 2001.*

Jian Huang; Yan Li; Crawfis, R.; Shao–Chiung Lu; Shu–h–Yuan Liou; "A Complete Distance Field Representation," Visualization, 2001. VIS '01. Proceedings, Oct. 21–26, 2001, pp 247–252.*

Hattori, T.; Yamasaki, T.; Watanabe, Y.; Sanada, H.; Tezuka, Y.; "Distance based vector field method for feature extraction of characters and figures;" Systems, Man, and Cybernetics, 1991; Decision Aiding for Complex Systems, Conference Proceedings, 1991.*

Russ, J.C.; "The Image Processing Handbook," CRC Press LLC, 2002, pp 425–429.*

(Continued)

*Primary Examiner*—Matthew C. Bella
*Assistant Examiner*—Alysa N. Brautigam
(74) *Attorney, Agent, or Firm*—Dirk Brinkman; Andrew J. Curtin

(57) ABSTRACT

A method and apparatus antialias a region of a two-dimensional distance field representing an object. The two-dimensional distance field is partitioned into cells where each cell includes a method for reconstructing the two-dimensional distance field within the cell. A set of cells of the two-dimensional distance field associated with the region is identified and a set of pixels associated with the region is located. For each pixel, a set of components is specified. For each component, a distance is determined from the set of cells and then mapped to the antialiased intensity of the component of the pixel.

134 Claims, 12 Drawing Sheets

U.S. PATENT DOCUMENTS

| | | | | |
|---|---|---|---|---|
| 6,603,484 | B1 * | 8/2003 | Frisken et al. | 345/622 |
| 6,721,446 | B1 * | 4/2004 | Wilensky et al. | 382/162 |
| 6,741,246 | B2 * | 5/2004 | Perry et al. | 345/420 |
| 2002/0097912 | A1 * | 7/2002 | Kimmel et al. | 382/199 |

OTHER PUBLICATIONS

Lau, W. H.; Wiseman, N.; "The Compositing Buffer: A Flexible Method for Image Generation and Image Editing," Computer Graphics Forum, vol. 14 (1995), No. 4, pp 229.*

McNamara, R., McCormack, J., Jouppi, N., "Prefiltered Antialiased Lines Using Half–Plane Distance Functions," HWWS 2000, Interlaken, Switzerland, 2000, pp 77–86.*

Satherley, R., Jones, M.W., "Hybrid Distance Field Computation," University of Wales Swansea, 2001, pp 1–16.*

Payne, B., Toga, A., "Distance Field Manipulation of Surface Models," IEEE 0272–17–16/92/0100–0065, Jan. 1992, pp 65–71.*

Kimmel, R., "Using Multi–Layer Distance Maps for Motion Planning on Surfaces with Moving Obstacles," IEEE 1051–4651/94, 1994, pp 367–372.*

IEEE Search Report.*

Zongker, D., Wade, G. and Salesin, D. 2000. Example–Based Hinting of TrueType Fonts. In *Proceedings ACM SIGGRAPH 2000*, pp. 411–416.

Whitted, T. 1980. An Improved Illumination Model for Shaded Display. In *Communications of the ACM*, Jun. 1980 vol. 23, No. 6.

Westover, Lee. Footprint Evaluation for Volume Rendering. In *Computer Graphics*, vol. 24, No. 4, Aug. 1990.

Turkowski, Kenneth. Anti–Aliasing through the Use of Coordinate Transformations. In *ACM Transactions on Graphics*, vol. 1, No. 3, Jul. 1982, pp. 215–234.

Sramek, M. and Kaufman, A. 1999. Alias–Free Voxelization of Geometric Objects. In *IEEE Transactions on Visualization and Computer Graphics*, 3(5), pp. 251–266.

Shamir, A. and Rappoport A. 1998. Feature–based Design of Fonts Using Constraints. In *Proc. Electronic Publishing 1998*, pp. 93–108.

Schneider, P. 1990. An Algorithm for Automatically Fitting Digitized Curves. In *Graphics GEMS I*, ed. A. Glassner, pp. 612–626.

Nishita, T., Sederberg, T., and Kakimoto M. 1990. Ray Tracing Trimmed Rational Surface Patches. Computer Graphics, vol. 24, No. 4, Aug. 1990.

Platt, J. 2000. Optimal Filtering for Patterned Displays. In *IEEE Signal Processing Letters*, 7(7), pp. 179–180.

Perry, R. and Frisken, S. 2001. Kizamu: A System for Sculpting Digital Characters. In *Proceedings ACM SIGGRAPH 2001*, pp. 47–56.

Osher, S and Sethian, J. 1988. Fronts Propagating with Curvature–Dependent Speed: Algorithms Based on Hamilton—Jacobi Formulations, *Journal of Computational Physics*, pp. 12–49.

O'Regan, K., Bismuth, N., Hersch, R. and Pappas, A. 1996. Legibility of Perceptually–Tuned Grayscale Fonts. In *Proc. IEEE Int. Conf. Image Processing*, pp. 537–540.

Mitchell, D. 1996. Consequences of Stratified Sampling In Graphics. In *Proc. ACM SIGRRAPH 1996*, pp. 277–280.

Mitchell, D. 1987. Generating Antialiase Images at Low Sampling Rates. In *Proc. ACM SIGRRAPH 1987*, pp. 65–72.

McNamara, R., McCormack, J. and Jouppi, N. 2000. Prefiltered Antialiased Lines Using Half–Plane Distance Functions. In *Proc. SIGGRAPH/Eurographics Workshop on Graphics Hardware 2000*, pp. 77–86.

Lee, M., Redner, R. and Uselton, S. 1985. Statistically Optimized Sampling for Distributed Ray Tracing. In *Proceedings ACM SIGGRAPH 1985*, pp. 61–67.

Lee, J., Forlizzi, J. and Hudson, S. 2002. The Kinetic Typography Engine: An Extensible System for Animating Expressive Text. In *Proc. UIST'02*, pp. 81–90.

Jones, T. and Perry, R. 2000. Antialiasing with Line Samples. In *Proceedings Eurographics Rendering Workshop*, pp. 197–205.

Johnson, D. and Cohen, E. 1998. A Framework For Efficient Minimum Distance Computations. In *Proc. IEEE International Conference on Robotics and Automation*, pp. 3678–3684.

Itoh, K. and Ohno, Y. 1993. A Curve Fitting Algorithm for Character Fonts. In Electronic Publishing 6(3), pp. 195–205.

Hu, C. and Hersch, R. 2001. Parameterizable Fonts Based on Shape Components. In *IEEE CG&A* May/Jun., pp. 70–85.

Hoff, K., Zaferakis, A., Lin, M. and Manocha, D. 2001. Fast and Simple 2D Geometric Proximity Queries Using Graphics Hardware. In Proc. Interactive 3D Graphics'01.

Hersch, R., Betrisey, C., Bur, J. and Gurtler A. 1995. Perceptually Tuned Generation of Grayscale Fonts. In *IEEE CG&A*, Nov., pp. 78–89.

Hersch, R. 1987. Character Generation Under Grid Constraints. In *Proceedings ACM SIGGRAPH 1987*, pp. 71–80.

Gupta, S. and Sproull, R. 1981. Filtering Edges for Grayscale Displays. In *Computer Graphics* 15(3), pp. 1–5.

Frisken, S. and Perry, R. 2003. Simple and Efficient Traversal Methods for Quadtrees and Octrees. To appear in *Journal of Graphics Tools*. See also MERL technical report TR2002–41.

Frisken, S. and Perry, R. 2002. Efficient Estimation of 3D Euclidean Distance Fields from 2D Range Images. In *Proc. IEEE/ACM SIGGRAPH Volume Visualization and Graphics Symposium 2002*, pp. 81–88.

Frisken, S., Perry, R., Rockwood, A. and Jones, T. 2000, Adaptively Sampled Distance Fields: a General Representation of Shape for Computer Graphics. In *Proceedings ACM SIGGRAPH 2000*, pp 249–254.

Desbrun, M. and Gascuel, M–P. 1995. Animating Soft Substances with Implicit Surfaces. In *Proc. SIGGRAPH 1995*. pp. 287–290.

Cook, R. 1986. Stochastic Sampling in Computer Graphics. in *ACM Transactions on Graphics*, pp. 51–72.

Betrisey, C., Blinn, J. F., Dresevic, B., Hill, B., Hitchcock, G., Keely, B., Mitchell, D. P., Platt, J. C. and Whitted, T. 2000. Displaced Filtering for Patterned Displays. In *Proc. Society for Information Display Symp.* pp. 296–299.

* cited by examiner

METHOD FOR ANTIALIASING AN OBJECT REPRESENTED AS A TWO-DIMENSIONAL DISTANCE FIELD IN OBJECT-ORDER

FIELD OF THE INVENTION

The invention relates generally to the field of computer graphics, and more particularly to rendering two-dimensional objects represented by distance fields.

BACKGROUND OF THE INVENTION

In the field of computer graphics, the rendering of two-dimensional objects is of fundamental importance. Two-dimensional objects, such as character shapes, corporate logos, and elements of an illustration contained in a document, are rendered as static images or as a sequence of frames comprising an animation. There are numerous representations for two-dimensional objects and it is often the case that one representation is better than another representation for specific operations such as rendering and editing. In these cases, a conversion from one form to another is performed.

Although we focus here on digital type, possibly the most common and important two-dimensional object, the following discussion applies to all types of two-dimensional objects.

We begin with some basic background on digital type. A typical Latin font family, such as Times New Roman or Arial, includes a set of fonts, e.g., regular, italic, bold and bold italic. Each font includes a set of individual character shapes called glyphs. Each glyph is distinguished by its various design features, such as underlying geometry, stroke thickness, serifs, joinery, placement and number of contours, ratio of thin-to-thick strokes, and size.

There are a number of ways to represent fonts, including bitmaps, outlines, e.g., Type 1 [Adobe Systems, Inc. 1990] and TrueType [Apple Computer, Inc. 1990], and procedural fonts, e.g., Knuth's Metafont, with outlines being predominant. Outline-based representations have been adopted and popularized by Bitstream Inc. of Cambridge, Mass., Adobe Systems, Inc. of Mountain View, Calif., Apple Computer, Inc., of Cupertino, Calif., Microsoft Corporation of Bellevue, Wash., URW of Hamburg, Germany, and Agfa Compugraphic of Wilmington, Mass.

Hersch, "*Visual and Technical Aspects of Type*," Cambridge University Press. 1993 and Knuth, "*TEX and METAFONT: New Directions in Typesetting*," Digital Press, Bedford, Mass. 1979, contain comprehensive reviews of the history and science of fonts.

Of particular importance are two classes of type size: body type size and display type size. Fonts in body type are rendered at relatively small point sizes, e.g., 14 pt. or less, and are used in the body of a document, as in this paragraph. Body type requires high quality rendering for legibility and reading comfort. The size, typeface, and baseline orientation of body type rarely change within a single document.

Fonts in display type are rendered at relatively large point sizes, e.g., 36 pt. or higher, and are used for titles, headlines, and in design and advertising to set a mood or to focus attention. In contrast to body type, the emphasis in display type is on esthetics, where the lack of spatial and temporal aliasing is important, rather than legibility, where contrast may be more important than antialiasing. It is crucial that a framework for representing and rendering type handles both of these two classes with conflicting requirements well.

Type can be rendered to an output device, e.g., printer or display, as bi-level, grayscale, or colored. Some rendering engines use bi-level rendering for very small type sizes to achieve better contrast. However, well-hinted grayscale fonts can be just as legible.

Hints are a set of rules or procedures stored with each glyph to specify how an outline of the glyph should be modified during rendering to preserve features such as symmetry, stroke weight, and a uniform appearance across all the glyphs in a typeface.

While there have been attempts to design automated and semi-automated hinting systems, the hinting process remains a major bottleneck in the design of new fonts and in the tuning of existing fonts for low-resolution display devices. In addition, the complexity of interpreting hinting rules precludes the use of hardware for font rendering. The lack of hardware support forces compromises to be made during software rasterization, such as the use of fewer samples per pixel, particularly when animating type in real time.

Grayscale font rendering typically involves some form of antialiasing. Antialiasing is a process that smoothes out jagged edges or staircase effects that appear in bi-level fonts. Although many font rendering engines are proprietary, most use supersampling, after grid fitting and hinting, with 4 or 16 samples per pixel followed by down-sampling with a 2×2 or 4×4 box filter, respectively.

Rudimentary filtering, such as box filtering, is justified by the need for rendering speed. However, even that approach is often too slow for real-time rendering, as required for animated type, and the rendered glyphs suffer from spatial and temporal aliasing.

Two important trends in typography reveal some inherent limitations of prior art font representations and thus provide the need for change.

The first trend is the increasing emphasis of reading text on-screen due to the dominant role of computers in the office, the rise in popularity of Internet browsing at home, and the proliferation of PDAs and other hand-held electronic devices. These displays typically have a resolution of 72–100 dots per inch, which is significantly lower than the resolution of printing devices.

This low-resolution mandates special treatment when rasterizing type to ensure reading comfort and legibility, as evidenced by the resources that companies such as Microsoft and Bitstream have invested in their respective ClearType and Font Fusion technologies.

The second trend is the use of animated type, or kinetic typography. Animated type is used to convey emotion, to add interest, and to visually attract the reader's attention. The importance of animated type is demonstrated by its wide use in television and Internet advertising.

Unfortunately, traditional outline-based fonts have limitations in both of these areas. Rendering type on a low-resolution display requires careful treatment in order to balance the needs of good contrast for legibility, and reduced spatial and/or temporal aliasing for reading comfort.

As stated above, outline-based fonts are typically hinted to provide instructions to the rendering engine for optimal appearance. Font hinting is labor intensive and expensive. For example, developing a well-hinted typeface for Japanese or Chinese fonts, which can have more than ten thousand glyphs, can take years. Because the focus of hinting is on improving the rendering quality of body type, the hints tend to be ineffective for type placed along arbitrary paths and for animated type.

Although high quality filtering can be used to antialias grayscale type in static documents that have a limited number of font sizes and typefaces, the use of filtering in animated type is typically limited by real-time rendering requirements.

SUMMARY OF THE INVENTION

The invention provides a method and apparatus for antialiasing a region of a two-dimensional distance field representing an object. The two-dimensional distance field is partitioned into cells where each cell includes a method for reconstructing the two-dimensional distance field within the cell. A set of cells of the two-dimensional distance field associated with the region is identified and a set of pixels associated with the region is located. For each pixel, a set of components is specified. For each component, a distance is determined from the set of cells and then mapped to the antialiased intensity of the component of the pixel.

In one aspect of the invention, the two-dimensional distance field is an adaptively sampled distance field.

In another aspect of the invention, the distance is determined from a single sample from the set of cells to provide efficient, high quality, antialiasing of the object.

In another aspect of the invention, adaptive distance-based supersampling provides optimal, efficient, high quality, antialiasing of the object.

In another aspect of the invention, distance-based automatic hinting provides high quality antialiasing of the object.

In another aspect of the invention, distance-based grid fitting provides high quality antialiasing of the object.

In another aspect of the invention, the individual addressability of the components of the pixel is exploited to provide an increase in the effective resolution of the antialiasing of the object.

DETAILED DESCRIPTION OF THE PREFERRED EMBODIMENT

Distance Field Representation of Glyphs

Figure 2A:
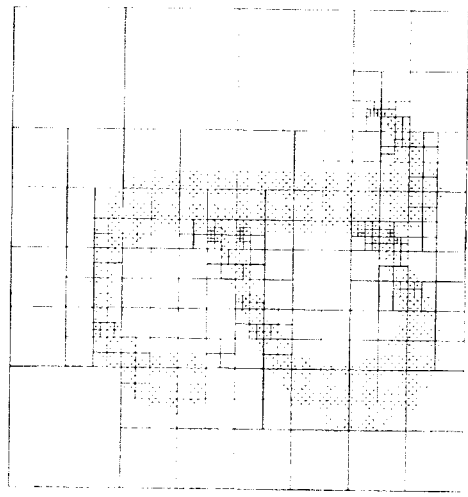
FIGS. 2A and 2B are block diagrams of distance field representations according to a preferred embodiment of the invention.

Our invention represents a closed two-dimensional shape S, such as a glyph, a corporate logo, or any digitized representation of an object, as a two-dimensional signed distance field D. For the purpose of our description, we use glyphs.

Informally, the distance field of a glyph measures a minimum distance from any point in the field to the edge of the glyph, where the sign of the distance is negative if the point is outside the glyph and positive if the point is inside the glyph. Points on the edge have a zero distance.

Formally, the distance field is a mapping $D:\Re^2 \to \Re$ for all $p \in \Re^2$ such that $D(p)=\text{sign}(p)\cdot\min\{\|p-q\|:$ for all points q on the zero-valued iso-surface, i.e., edge, of S$\}$, $\text{sign}(p)=\{-1$ if p is outside S, $+1$ if p is inside S$\}$, and $\|\cdot\|$ is the Euclidean norm.

Prior art coverage-based rendering methods that use a single discrete sample for each pixel can completely miss the glyph even when the sample is arbitrarily close to the outline. The rendered glyph has jagged edges and dropout, which are both forms of spatial aliasing. If the glyph is animated, then temporal aliasing causes flickering outlines and jagged edges that seem to 'crawl' during motion. Taking additional samples per pixel to produce an antialiased rendition can reduce these aliasing effects, but many samples may be required for acceptable results.

In contrast, continuously sampled distance values according to our invention indicate a proximity of the glyph, even when the samples are outside the shape.

Furthermore, because the distance field varies smoothly, i.e., it is $C^0$ continuous, sampled values change slowly as the glyph moves, reducing temporal aliasing artifacts.

Distance fields have other advantages. Because they are an implicit representation, they share the benefits of implicit functions. In particular, distance fields enable an intuitive interface for designing fonts. For example, individual components of glyphs such as stems, bars, rounds, and serifs can be designed separately. After design, the components can be blended together using implicit blending methods to compose different glyphs of the same typeface.

Distance fields also have much to offer in the area of kinetic typography or animated type because distance fields provide information important for simulating interactions between objects.

In a preferred embodiment, we use adaptively sample distance fields, i.e., ADFs, see U.S. Pat. No. 6,396,492, "Detail-directed hierarchical distance fields," Frisken, Perry, and Jones, incorporated herein by reference.

ADFs are efficient digital representations of distance fields. ADFs use detail-directed sampling to reduce the number of samples required to represent the field. The samples are stored in a spatial hierarchy of cells, e.g., a quadtree, for efficient processing. In addition, ADFs provide a method for reconstructing the distance field from the sampled values.

Detail-directed or adaptive sampling samples the distance field according to a local variance in the field: more samples are used when the local variance is high, and fewer samples are used when the local variance is low. Adaptive sampling significantly reduces memory requirements over both regularly sampled distance fields, which sample at a uniform rate throughout the field, and 3-color quadtrees, which always sample at a maximum rate near edges.

Figure 2B:
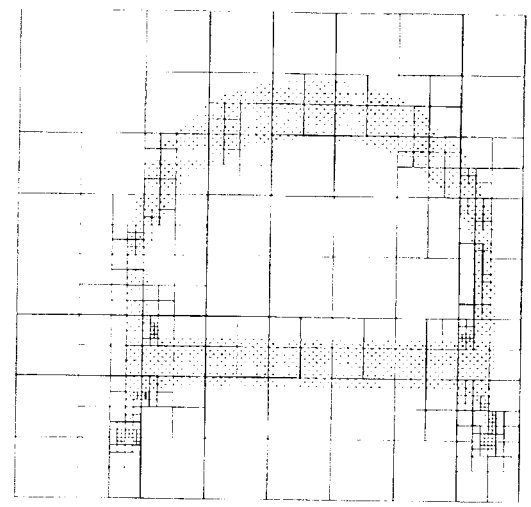
Figure 1A:
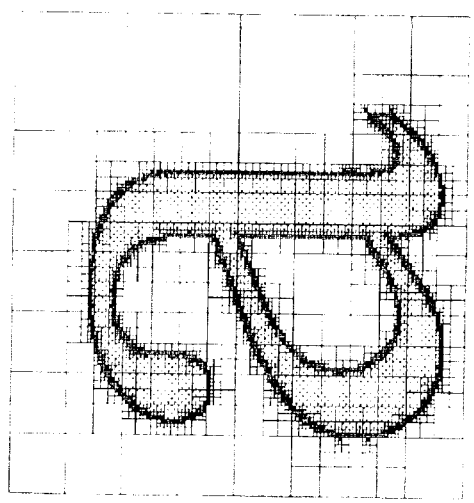
FIGS. 1A and 1B are block diagrams of prior art distance field representations for glyphs.
Figure 1B:
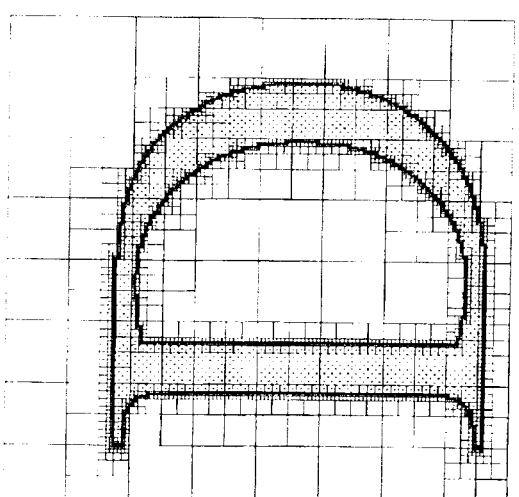

FIGS. 1A–1B compare the number of cells required for a 3-color quadtree for a Times Roman 'a' and 'D' with the number of cells required for a bi-quadratic ADF in FIGS. 2A–2B of the same accuracy. The number of cells is directly related to storage requirements. Both quadtrees have a resolution equivalent to a 512×512 image of distance values. The 3-color quadtrees for the 'a' and the 'D' have 17,393 and 20,813 cells respectively, while their corresponding bi-quadratic ADFs have 457 and 399 cells. Bi-quadratic ADFs typically require 5–20 times fewer cells than the prior art bi-linear representation of Frisken et al., "Adaptively Sampled Distance Fields: a General Representation of Shape for Computer Graphics," *Proceedings ACM SIGGRAPH 2000*, pp. 249–254, 2000.

Bi-Quadratic Reconstruction Method

Frisken et al. use a quadtree for the ADF spatial hierarchy, and reconstruct distances and gradients inside each cell from the distances sampled at the four corners of each cell via bi-linear interpolation. They suggest that "higher order reconstruction methods . . . might be employed to further increase compression, but the numbers already suggest a point of diminishing return for the extra effort".

However, bi-linear ADFs are inadequate for representing, rendering, editing, and animating character glyphs according to the invention. In particular, they require too much memory, are too inefficient to process, and the quality of the reconstructed field in non-edge cells is insufficient for operations such as dynamic simulation.

A "bounded-surface" method can force further subdivision in non-edge cells by requiring that non-edge cells within a bounded distance from the surface, i.e., an edge, pass an error predicate test, see Perry et al., "Kizamu: A System for Sculpting Digital Characters," *Proceedings ACM SIGGRAPH* 2001, pp. 47–56, 2001. Although that reduces the error in the distance field within this bounded region, we have found that for bi-linear ADFs that method results in an unacceptable increase in the number of cells.

To address those limitations, we replace the bi-linear reconstruction method with a bi-quadratic reconstruction method. Bi-quadratic ADFs of typical glyphs tend to require 5–20 times fewer cells than bi-linear ADFs. Higher reduction in the required number of cells occurs when we require an accurate distance field in non-edge cells for operations such as dynamic simulation and animated type.

This significant memory reduction allows the glyphs required for a typical animation to fit in an on-chip cache of modern CPUs. This has a dramatic effect on processing times because system memory access is essentially eliminated, easily compensating for the additional computation required by the higher order reconstruction method.

Figure 3:
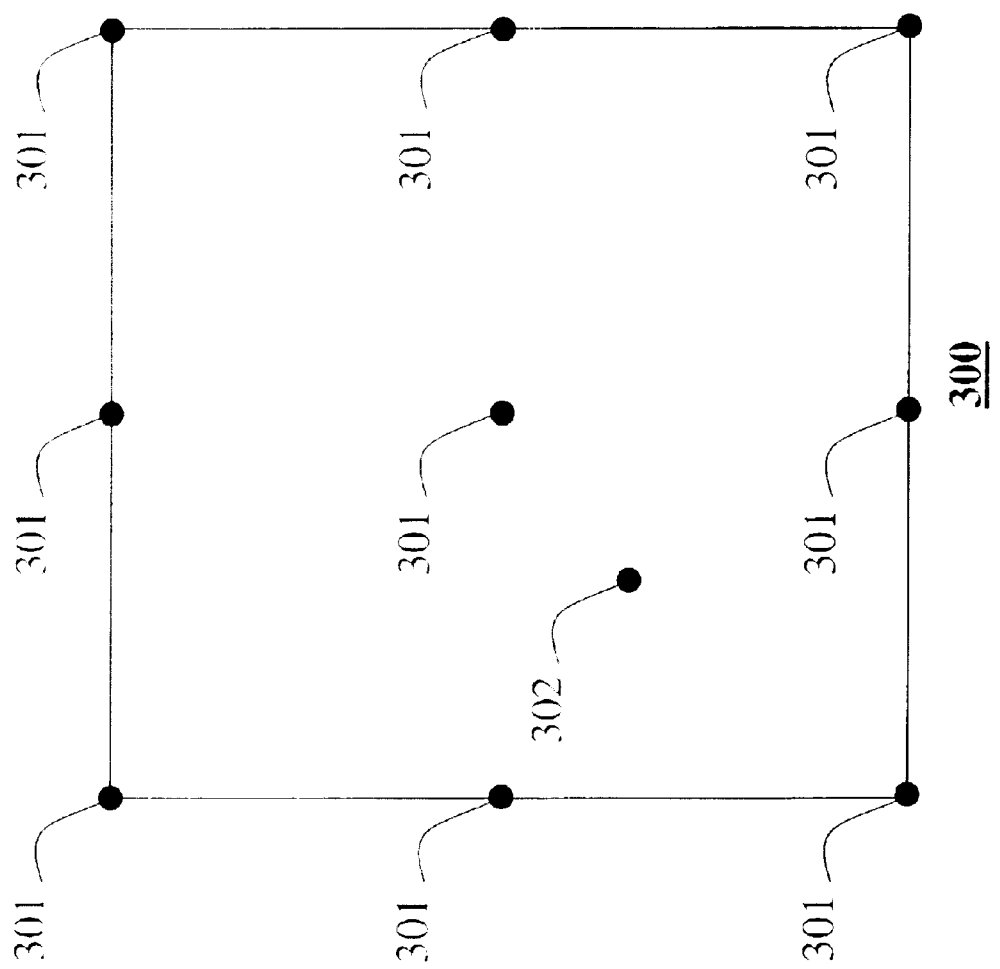
FIG. 3 is a block diagram of a bi-quadratic cell of the distance field according to a preferred embodiment of the invention.

FIG. 3 illustrates a bi-quadratic ADF cell 300 according to our preferred embodiment. Each cell in the bi-quadratic ADF contains nine distance values 301. A distance and a gradient at a point (x, y) 302 are reconstructed from these nine distance values according to Equations 1–3 below.

There are a variety of bi-quadratic reconstruction methods available. We use a bivariate interpolating polynomial which guarantees $C^0$ continuity along shared edges of neighboring cells of identical size. As with the bi-linear method, continuity of the distance field between neighboring cells of different size is maintained to a specified tolerance using an error predicate. The error predicate controls cell subdivision during ADF generation, see Perry et al., above.

The distance and gradient at the point (x, y) 302, where x and y are expressed in cell coordinates, i.e., (x, y) $\in$ [0,1] x [0,1], are determined as follows:

Let $xv_1 = x - 0.5$ and $xv_2 = x - 1$

Let $yv_1 = y - 0.5$ and $yv_2 = y - 1$

Let $bx_1 = 2xv_1 \cdot xv_2$, $bx_2 = -4x \cdot xv_2$, and $bx_3 = 2x \cdot xv_1$ Let $by_1 = 2yv_1 \cdot yv_2$, $by_2 = -4y \cdot yv_2$, and $by_3 = 2y \cdot yv_1$ $\text{dist} = by_1 \cdot (bx_1 \cdot d_1 + bx_2 \cdot d_2 + bx_3 \cdot d_3) +$ $by_2 \cdot (bx_1 \cdot d_4 + bx_2 \cdot d_5 + bx_3 \cdot d_6) +$ $by_3 \cdot (bx_1 \cdot d_7 + bx_2 \cdot d_8 + bx_3 \cdot d_9)$ \hfill (1)

$\text{grad}_x = -[by_1 \cdot (4x \cdot (d_1 - 2d_2 + d_3) - 3d_1 - d_3 + 4d_2) +$ $by_2 \cdot (4x \cdot (d_4 - 2d_5 + d_6) - 3d_4 - d_6 + 4d_5) +$ $by_3 \cdot (4x \cdot (d_7 - 2d_8 + d_9) - 3d_7 - d_9 + 4d_8)]$ \hfill (2)

$\text{grad}_y = -[(4y-3) \cdot (bx_1 \cdot d_1 + bx_2 \cdot d_2 + bx_3 \cdot d_3) - (8y-4) \cdot (bx_1 \cdot d_4 + bx_2 \cdot d_5 + bx_3 \cdot d_6) + (4y-1) \cdot (bx_1 \cdot d_7 + bx_2 \cdot d_8 + bx_3 \cdot d_9)]$. \hfill (3)

Reconstructing a distance using floating point arithmetic can require ~35 floating-point operations (flops), and reconstructing a gradient using floating point arithmetic can require ~70 flops. Because our reconstruction methods do not contain branches and the glyphs can reside entirely in an on-chip cache, we can further optimize these reconstruction methods by taking advantage of special CPU instructions and the deep instruction pipelines of modern CPUs. Further, we can reconstruct a distance and a gradient using fixed-point arithmetic.

Compression for Transmission and Storage

Linear Quadtrees

The spatial hierarchy of the ADF quadtree is required for some processing, e.g., collision detection, but is unnecessary for others, e.g., cell-based rendering as described below.

To provide compression for transmission and storage of ADF glyphs, we use a linear quadtree structure, which stores our bi-quadratic ADF as a list of leaf cells. The tree structure can be regenerated from the leaf cells as needed.

Each leaf cell in the linear ADF quadtree includes the cell's x and y positions in two bytes each, the cell level in one byte, the distance value at the cell center in two bytes, and the eight distance offsets from the center distance value in one byte each, for a total of 15 bytes per cell.

Each distance offset is determined by subtracting its corresponding sample distance value from the center distance value, scaling by the cell size to reduce quantization error, and truncating to eight bits. The two bytes per cell position and the one byte for cell level can represent ADFs up to $2^{16} \times 2^{16}$ in resolution. This is more than adequate for representing glyphs to be rendered at display screen resolutions.

Glyphs can be accurately represented by 16-bit distance values. Encoding eight of the distance values as 8-bit distance offsets provides substantial savings over storing each of these values in two bytes. Although, in theory, this may lead to some error in the distance field of large cells, we have not observed any visual degradation.

A high-resolution glyph typically requires 500–1000 leaf cells. Lossless entropy encoding can attain a further 35–50% compression. Consequently, an entire typeface of high-resolution ADFs can be represented in 300–500 Kbytes. If only body type is required or the target resolution is very coarse, as for cell phones, then lower resolution ADFs can be used that require ¼ to ½ as many cells.

These sizes are significantly smaller than grayscale bitmap fonts, which require ~0.5 Mbytes per typeface for each point size, and are comparable in size to well-hinted outline-based fonts. Sizes for TrueType fonts range from 10's of Kbytes to 10's of Mbytes depending on the number of glyphs and the amount and method of hinting. Arial and Times New Roman, two well-hinted fonts from the Monotype Corporation, require 266 Kbytes and 316 Kbytes respectively.

Run-time Generation from Outlines

According to our invention, and as described in detail below, ADFs can be generated quickly from existing outline or boundary descriptors, e.g., Bezier curves, using the tiled generator described by Perry et al. The minimum distance to a glyph's outline or boundary is computed efficiently using Bezier clipping, see Sederberg et al., "Geometric Hermite Approximation of Surface Patch Intersection Curves," *CAGD*, 8(2), pp. 97–114, 1991.

Generation requires 0.04–0.08 seconds per glyph on a 2 GHz Pentium IV processor. An entire typeface can be generated in about four seconds. Because conventional hints are not needed, the boundary descriptors required to generate the ADFs are substantially smaller than their corresponding hinted counterparts.

Therefore, rather than storing ADFs, we can store these minimal outlines and generate ADF glyphs dynamically from these outlines on demand. The reduced size of these minimal outlines is important for devices with limited memory and for applications that transmit glyphs across a bandwidth-limited network.

Figure 10:
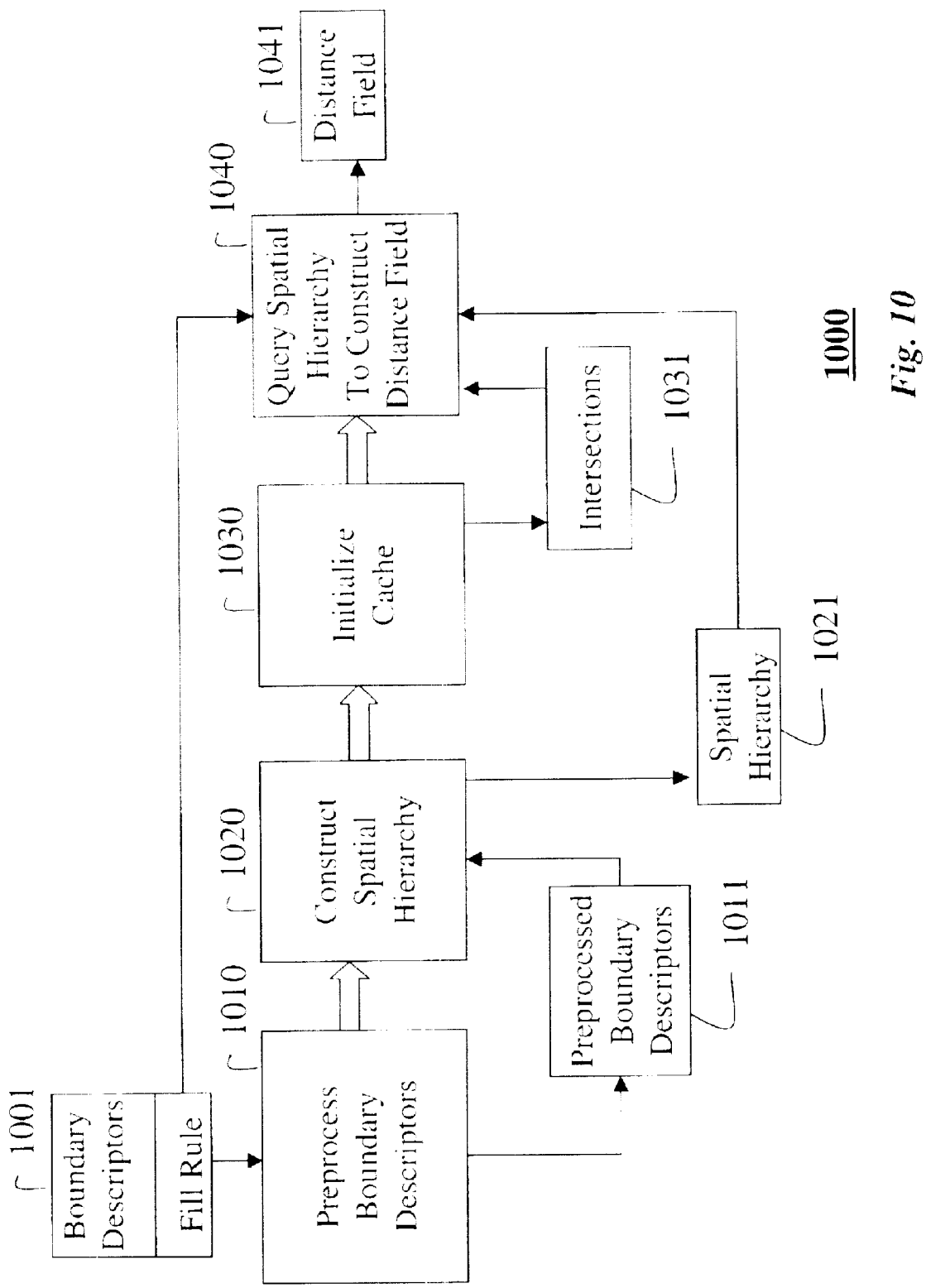
FIG. 10 is a flow diagram of a method for converting a two-dimensional object to a distance field according to the invention.

FIG. 10 shows a method 1000 for converting a two-dimensional object, such as a glyph, to a two-dimensional distance field. The object 1001 is represented as a set of boundary descriptors, e.g., splines, and a fill rule, e.g., an even-odd rule or a non-zero winding rule.

The set of boundary descriptors are first preprocessed 1010. The preprocessing subdivides the boundary descriptors to reduce their spatial extent. The boundary descriptors can also be coalesced to reduce the cardinality of the set of boundary descriptors. The preprocessing allows us to reduce the number of boundary descriptors that need to be queried for each location when determining the unsigned distance, as described below.

A spatial hierarchy 1021, e.g., a quadtree, is constructed 1020 from the preprocessed set of boundary descriptors 1011. A cache of intersections 1031 is initialized 1030. The cache of intersections 1031 stores locations where the boundary descriptors intersect a set of lines, e.g., horizontal, vertical, diagonal, etc., of the distance field, and the direction of the intersection. This eliminates redundant computations when determining the sign of the unsigned distances. The intersections can be sorted by intervals.

The spatial hierarchy 1021 is then queried 1040 at a set of locations to determine a set of distances at those locations. The set of distances is used to construct a two-dimensional distance field 1041. The querying invokes a distance function, e.g., Bezier clipping, at each location to determine an unsigned distance. The cache of intersections, the location, and the fill rule are used to determine a sign for the distance.

Compression via Component-Based Fonts

Significant compression for Chinese, Japanese, and Korean fonts, which can consist of 10,000 or more glyphs, can be achieved by using a component-based representation as in Font Fusion. That representation decomposes glyphs into common strokes and radicals, i.e., complex shapes common to multiple glyphs, stores the strokes and radicals in a font library, and then recombines them in the font rendering engine.

Because distance fields are an implicit representation, ADFs can be easily combined using blending or CSG operations, and thus are well suited for compression via that component-based approach.

Representing Corners in a Two Dimensional Distance Field

Detail-directed sampling with a bilinear or bi-quadratic reconstruction method allows ADFs to represent relatively smooth sections of a boundary of a two-dimensional object with a small number of distance values. However, near corners, the distance field has a high variance that is not well approximated by these reconstruction methods. In order to represent the distance field near corners accurately, such ADFs require cells containing corners to be highly subdivided, significantly increasing memory requirements. In addition, a maximum subdivision level of the ADF, imposed during ADF generation as described in Perry et al., limits the accuracy with which corners can be represented using bilinear and bi-quadratic ADF cells.

Figure 13:
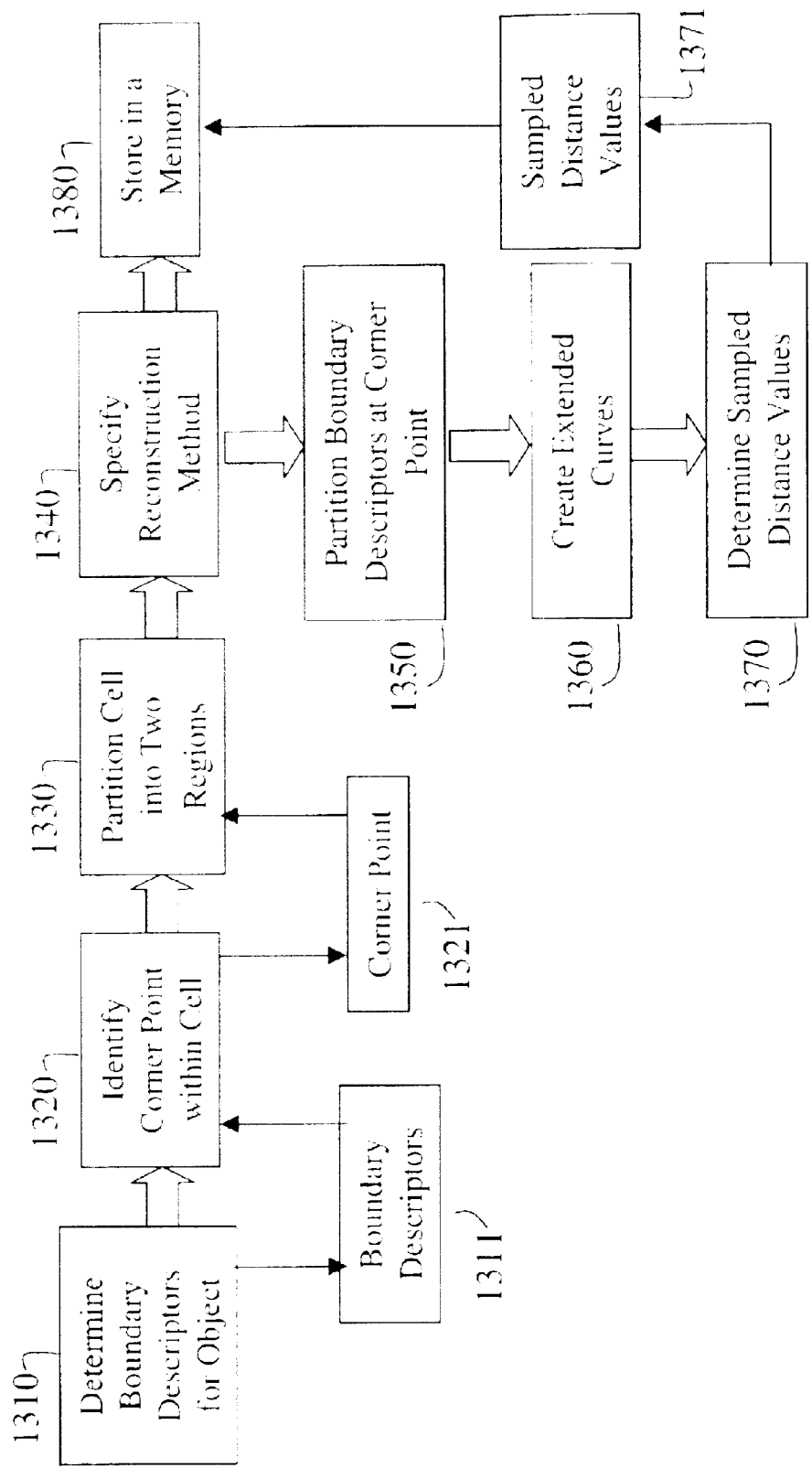
FIG. 13 is a flow diagram of a method for generating a two-dimensional distance field within a cell enclosing a corner of a two-dimensional object according to the invention.

To address this problem, our invention provides a method 1300 as shown in FIG. 13 for generating a two-dimensional distance field within a cell associated with a corner of a two-dimensional object, such as a glyph.

The method 1300 determines 1310 an ordered set of boundary descriptors 1311 from the two-dimensional object and identifies 1320 a corner point 1321 within a cell from the ordered set of boundary descriptors 1311. The cell is then partitioned 1330 into two regions, a first region nearest the corner and a second region nearest the boundary of the object. The method 1300 also specifies 1340 a reconstruction method and a set of sampled distance values 1371 for reconstructing distances within the cell and stores 1380 the corner point 1321, lines delimiting the regions, the reconstruction method, and the set of sampled distance values 1371 in a memory.

The reconstruction method determines a distance at a point within the cell according to which region the point lies in. A distance for a query point in the first region is determined as the distance from the query point to the corner point.

For determining distances in the second region, we partition 1350 the ordered set of boundary descriptors 1311 into two subsets, one comprising boundary descriptors before the corner point 1321 and one comprising boundary descriptors after the corner point 1321. Each subset of boundary descriptors is then extended 1360 to form an extended curve that partitions the cell into an interior and exterior section. For each section, the distance field within the cell can be reconstructed from the set of sample distance values 1371 that are determined 1370 from the corresponding extended curve. A bi-quadratic reconstruction method would require that nine distance values be stored for each of the two extended curves.

Note that the intersection of the two interior sections forms the corner of the object. Hence, distances within the second region can be determined by reconstructing a distance to the first interior section and a distance to the second interior section and then selecting the minimum of the two determined distances.

The two regions can be specified from two directed lines passing through the corner point, each line perpendicular to one of the two subsets of boundary descriptors. Each line can be specified by the corner point and the outward facing normal of the corresponding subset of boundary descriptors at the corner point. When a line is thus defined, we can determine which side of the line a query point lies on by determining a cross product of a vector from the query point to the corner point and the outward facing normal. Points lying on the exterior side of both lines lie in the first region while points lying on the interior side of either line lie in the second region.

Font Rendering

In today's font rendering engines, fonts are predominantly represented as outlines, which are scaled as needed to match the desired output size. While most high-resolution printers use bi-level rendering, modern display devices more commonly use grayscale rendering or a combination of grayscale and bi-level rendering at small point sizes.

A common approach for rasterizing grayscale glyphs involves scaling and hinting their outlines. The scaled and hinted outlines are scan converted to a high-resolution image, typically four or sixteen times larger than the desired resolution. Then, the high-resolution image is down-sampled by applying a filtering method, e.g., a box filter, to produce the final grayscale image.

For body type, individual glyphs can be rasterized once and stored in a cache as a grayscale bitmap for reuse in a preprocessing step. The need for sub-pixel placement of a glyph may require several versions of each glyph to be rasterized. Use of a cache for body type permits higher quality rendering with short delays, e.g., ½ second, during tasks such as paging through an Adobe Acrobat PDF document.

However, type rendered on arbitrary paths and animated type precludes the use of a cache and therefore must be generated on demand. Real-time rendering requirements force the use of lower resolution filtering, typically four samples per pixel and box filtering. This can cause spatial and temporal aliasing. The aliasing can be reduced using hinted device fonts residing in system memory. However, maintaining real-time frame rates places severe constraints on how hinted device fonts can be used, e.g., hinted device fonts cannot be scaled or rotated dynamically.

Recent work at Microsoft on ClearType has led to special treatment for LCD color displays that contain a repeating pattern of addressable colored sub-pixels, i.e., components. Platt, in "Optimal Filtering for Patterned Displays," *IEEE Signal Processing Letters*, 7(7), pp. 179–180, 2000, describes a set of perceptually optimal filters for each color component. In practice, the optimal filters are implemented as a set of three displaced box filters, one for each color.

ClearType uses prior art coverage based antialiasing methods to determine the intensity of each component of each pixel. In contrast, our distance field based method uses the distance field to determine the intensity of each component of each pixel, and does so using fewer samples. Our ADF antialiasing method described below can replace the box filters to provide better emulation of the optimal filters with fewer samples per pixel.

Antialiasing

Understanding appearance artifacts in rendered fonts requires an understanding of aliasing. Typically, a pixel is composed of discrete components, e.g., a red, green, and blue component in a color printer or display. In a grayscale device, the pixel is a single discrete component. Because pixels are discrete, rendering to an output device is inherently a sampling process. The sampling rate is dependent on the resolution of the device. Unless the sampling rate is at least twice the highest (Nyquist) frequency in the source signal, the sampled signal exhibits aliasing.

Edges, e.g., glyph outlines, have infinite frequency components. Hence, edges cannot be represented exactly by sampled data. Inadequate sampling of edges results in jaggies, which tend to crawl along the sampled edges in moving images. If the source signal also contains a spatial pattern, e.g., the repeated vertical stems of an 'm' or the single vertical stem of an 'i', whose frequency components are too high for the sampling rate, then the sampled data can exhibit dropout, moiré patterns, and temporal flicker.

To avoid aliasing, the input signal must be pre-filtered to remove frequency components above those permitted by the sampling rate. In general, there are two approaches to pre-filtering.

The first is known as analytic filtering. It applies some form of spatial averaging to a continuous representation of the source signal before sampling. Unfortunately, analytic filtering is often not possible, either because the source data are not provided as a continuous signal, which is the normal case for image processing, or because determining an analytic description of the signal within the filter footprint is too complex. This is the case for all but simple geometric shapes in computer graphics and certainly the case for spline-based outlines.

The second approach is known as discrete filtering. In that approach, the source signal is typically sampled at a higher rate than the target rate to obtain a supersampled image. Then, a discrete filter is applied to reduce high frequencies in the supersampled image before down-sampling the image to the target rate. The discrete approach is referred to as regular supersampling in computer graphics.

Various discrete filters can be applied depending on the processing budget, hardware considerations, and personal preferences for contrast versus smoothness in the output image. The box filter typically used to render type simply replaces a rectangular array of supersampled values with their arithmetic average and is generally regarded as inferior in the signal processing community.

In another approach, adaptive supersampling focuses available resources for sampling and filtering on areas of the image with higher local frequency components. Optimal adaptive sampling can be determined from the local variability in the image. However, the usefulness of this technique is limited by the need to estimate the local variance of the image, a process that can be computationally expensive.

Moiré patterns, due to inadequate regular sampling of high frequency patterns, are particularly objectionable to the human visual system. In general image processing, stochastic or jittered sampling has been used to solve this problem. With stochastic sampling, the samples are randomly displaced slightly from their nominal positions. Stochastic sampling tends to replace moiré pattern aliasing with high frequency noise and has been shown to be particularly effective in reducing temporal aliasing.

Rendering with Distance-based Antialiasing

The infinite frequency components introduced by edges of a glyph are a major contribution to aliasing in prior art font rendering. In contrast, by using 2D distance fields to represent 2D objects and then sampling the 2D distance fields according to the invention, we avoid such edges because the representation is $C^0$ continuous. Instead, a maximum frequency depends on a spatial pattern of the glyph itself, e.g., the repeated vertical stems of an 'm' or the single vertical stem of an 'i'.

By representing the glyph by its 2D distance field, we are effectively applying an analytic pre-filter to the glyph. Our antialiasing methods for rendering distance fields as described below yield an output that is different from the output of a conventional analytic pre-filter.

Antialiasing with Distance Fields

Figure 4:
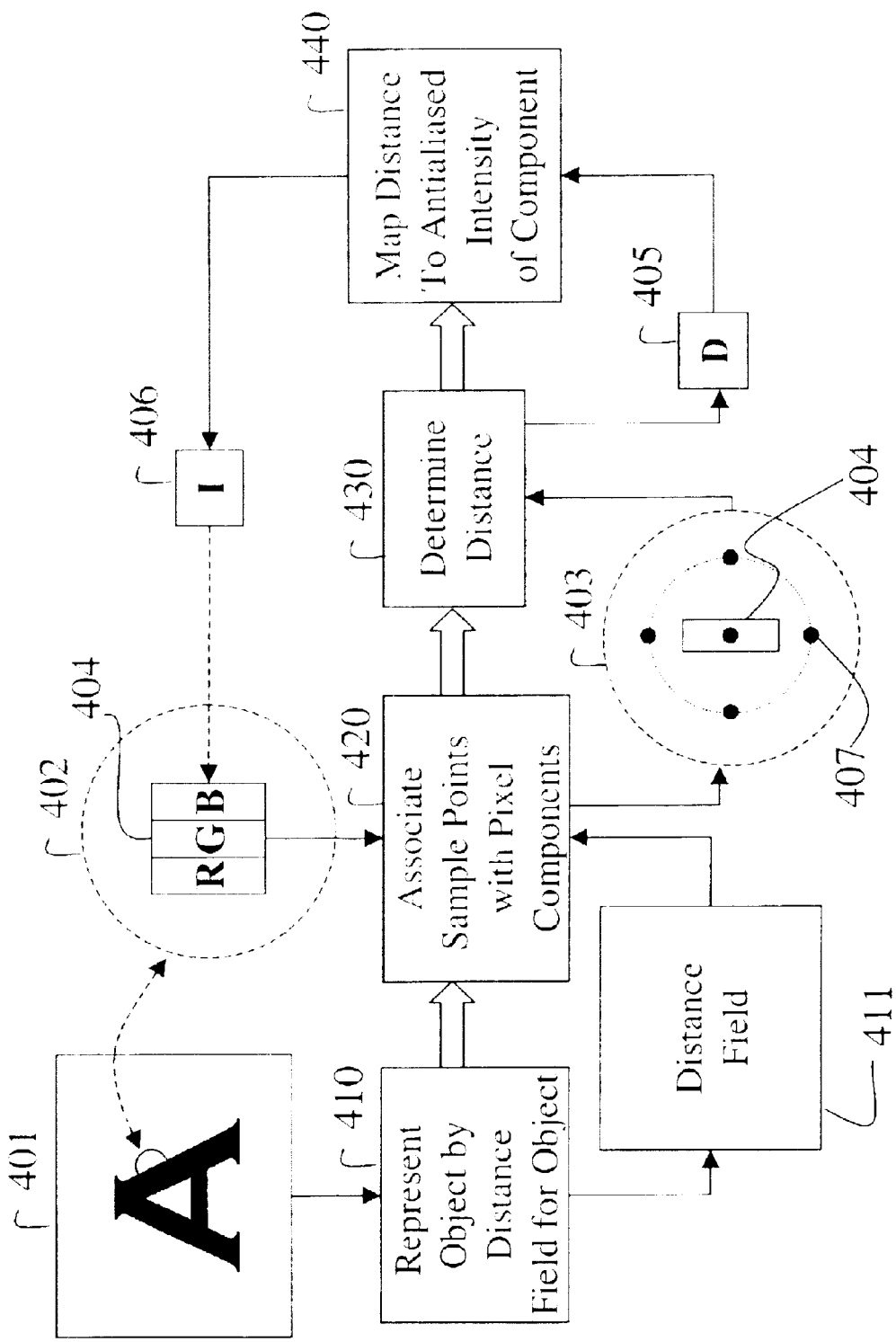
FIG. 4 is a flow diagram of a method for antialiasing an object in image-order according to the invention.

FIG. 4 shows a method 400 for antialiasing, in image-order, an object 401, e.g., a glyph, represented 410 as a two-dimensional distance field 411. Each pixel 402 can include one or more components 404, typically a red, blue, and green component for a 'RGB' type of output device. This method can use one or more samples for each component 404 of each pixel 402. The method 400 provides adaptive distance-based super sampling, distance-based automatic hinting, and distance-based grid fitting. The resulting antialiased pixel intensity can be rendered on CRT and LCD-like displays as part of an image. The method is particularly useful for rendering motion blur.

A set 403 of sample points 407 in the two-dimensional distance field 411 representing the object 401 is associated 420 with each component 404 of each pixel 402. A distance (D) 405 is determined 430 from the two-dimensional distance field 411 and the set of sample points 403. Then, the distance 405 is mapped 440 to an antialiased intensity (I) 406 of the component 404 of the pixel 402.

In the preferred embodiment, the glyph 401 is represented 410 by a bi-quadratic ADF 411, as described above. This makes it efficient to apply distance-based antialiasing during font rendering. Other representations such as a two-dimensional distance map, a two-dimensional distance shell, and a procedural distance field can also be used.

For each component 404 of each pixel 402 in an image, a cell, e.g., a leaf cell, containing the component 404 is located using a quadtree traversal method described in U.S. patent application Ser. No. 10/209,302, filed on Jul. 31, 2002 and titled "Method for Traversing Quadtrees, Octrees, and N-Dimensional Bi-trees," incorporated herein by reference in its entirety. Although other traversal methods known in the art can be used with our invention, the aforementioned method is comparison-free and therefore executes efficiently. The distance at the component 404 is reconstructed from the cell's distance values and mapped 440 to the antialiased intensity (I) 406.

Different mappings can be used, including linear, Gaussian, and sigmoidal functions. Selection of the best mapping function is subjective. In one embodiment, our mapping is a composition of two functions. The first function is as described above, the second is a contrast enhancement function. These two functions are composed to map 440 the distance field (D) 405 to the antialiased intensity (I) 406 of the component 404.

Figure 5:
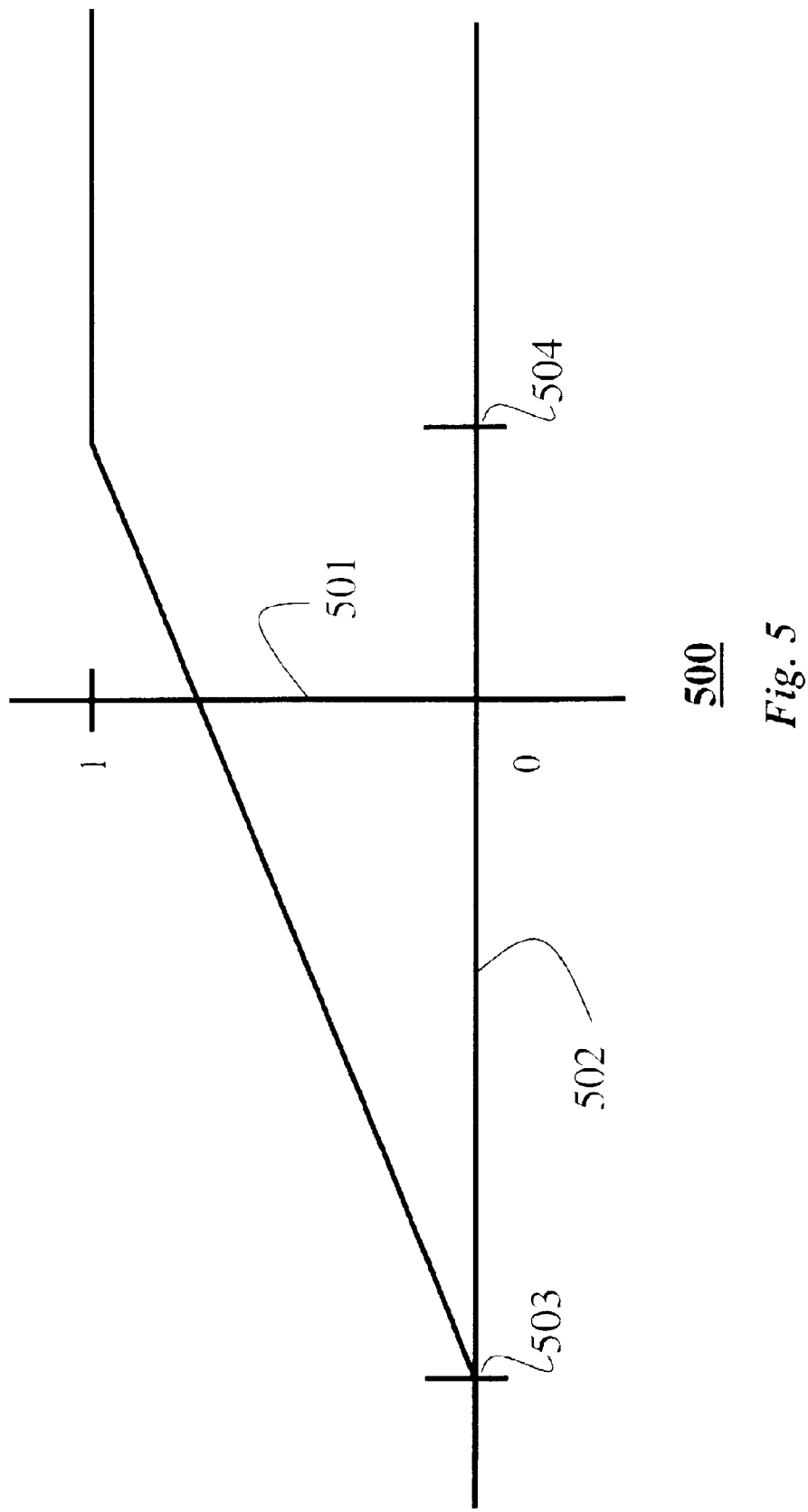
FIG. 5 is a graph of a linear filter used by the invention.

FIG. 5 shows a linear mapping 500 of intensity 501, e.g., [0,1], as a function of distance 502. The mapping converts a distance to an antialiased image intensity for each component of the pixel. Distances are positive inside the object and negative outside the object. Different cutoff values 503 and 504 affect the edge contrast and stroke weight. We achieve good results with outside 503 and inside 504 filter cutoff values of (−0.75, 0.75) pixels for display type, and (−0.5, 0.625) pixels for body type.

Optimal Distance-based Adaptive Supersampling

The above described distance-based antialiasing method reduces aliasing due to glyph edges. However, aliasing artifacts still occur when stem widths or spacing between glyph components are too small for the display's sampling rate. In such cases, we apply distance-based adaptive supersampling as described below to further reduce spatial and temporal aliasing.

In the preferred embodiment, we use bi-quadratic ADFs with our novel distance-based adaptive supersampling to provide significant advantages over prior art outline-based representations and coverage-based adaptive supersampling methods. Because ADFs use detail-directed sampling, regions of the distance field with higher local variance are represented by smaller leaf cells. Hence, the structure of the ADF quadtree provides the map of local variance required to implement optimal distance-based adaptive sampling, overcoming the difficulty in the prior art adaptive supersampling antialiasing methods of determining the local variance as described above.

For each component 404 of each pixel 402 in the image, the cell containing the component 404 is located, and a set 403 of sample points 407 within a filter radius, r, of the component is associated 420 with the pixel component 404. The number of sample points 407 per component (spc) depends on the relative size of the cell (cellSize) to r. Sampled distances at the sample points 407 are filtered to determine 430 a single weighted average distance 405 that is then mapped 440 to an antialiased intensity 406 of the component 404 of the pixel 402.

Various filters and sampling strategies are possible. In the preferred embodiment we use a general form of a Gaussian filter, weighting each distance sample by $W^1 2^{-3(d/r)^2}$, where d is the distance from the sample point to the component of the pixel and W is the sum of the weights used for that component. Similar results can be obtained with box filters, cone filters, negative lobe filters, and other forms of the Gaussian filter.

Figure 6C:
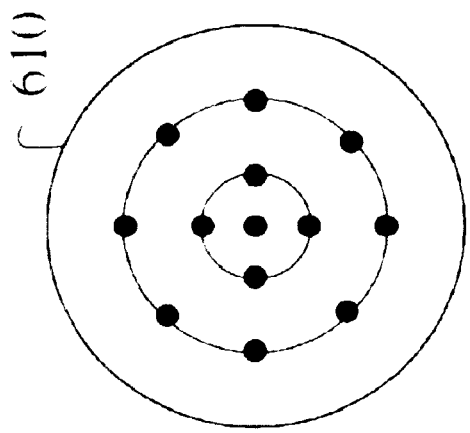
FIGS. 6A, 6B, and 6C are diagrams of samples near a component of a pixel.
Figure 6B:
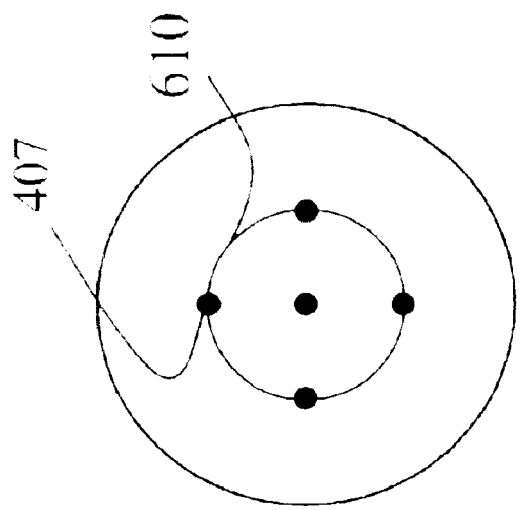
Figure 6A:
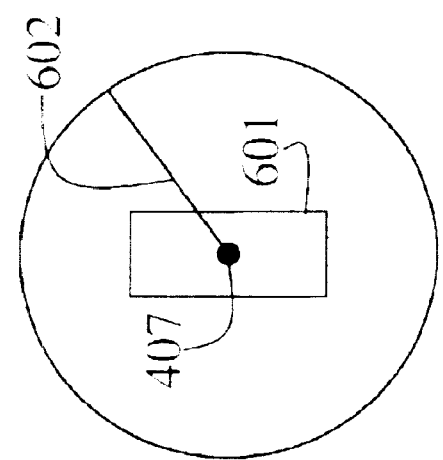

FIG. 6A–C shows our sampling strategy. Samples 407 are placed in concentric circles 610 near the component 601 for efficient computation of the weights and weight sums. We use a filter radius r 602 of 1.3 times the inter-pixel spacing and sample with 1 spc when cellSize>r (FIG. 6A), 5 spc when $r/2 < cellSize \leq r$ (FIG. 6B), and 13 spc when cellSize $\leq r/2$ (FIG. 6C).

Rather than concentric circles, the invention can use numerous other strategies to associate sample points 407 with pixel components 404. Our method is not particularly sensitive to the exact sampling strategy.

Another adaptive sampling strategy, described below, places sample points at the centers of all the cells contained within the filter radius r. This strategy has equally good results.

Cell-Based Antialiasing

The distance field antialiasing methods described above can be implemented in software using scanline-based rasterization. Alternatively, distance fields partitioned into cells can be antialiased cell-by-cell, i.e., in object-order. Cell-based rendering eliminates tree traversal for locating cells containing the sample points, eliminates redundant setup for computing distances and gradients within a single cell, and reduces repeated retrieval, i.e., memory fetches, of cell data.

In addition, because the cells required for rendering can be represented as a sequential block of fixed sized, self-contained units, i.e., distances and gradients for points within a cell are determined from the cell's distance values, our cell-based approach is amenable to hardware implementations, enabling real-time rendering.

Figure 7:
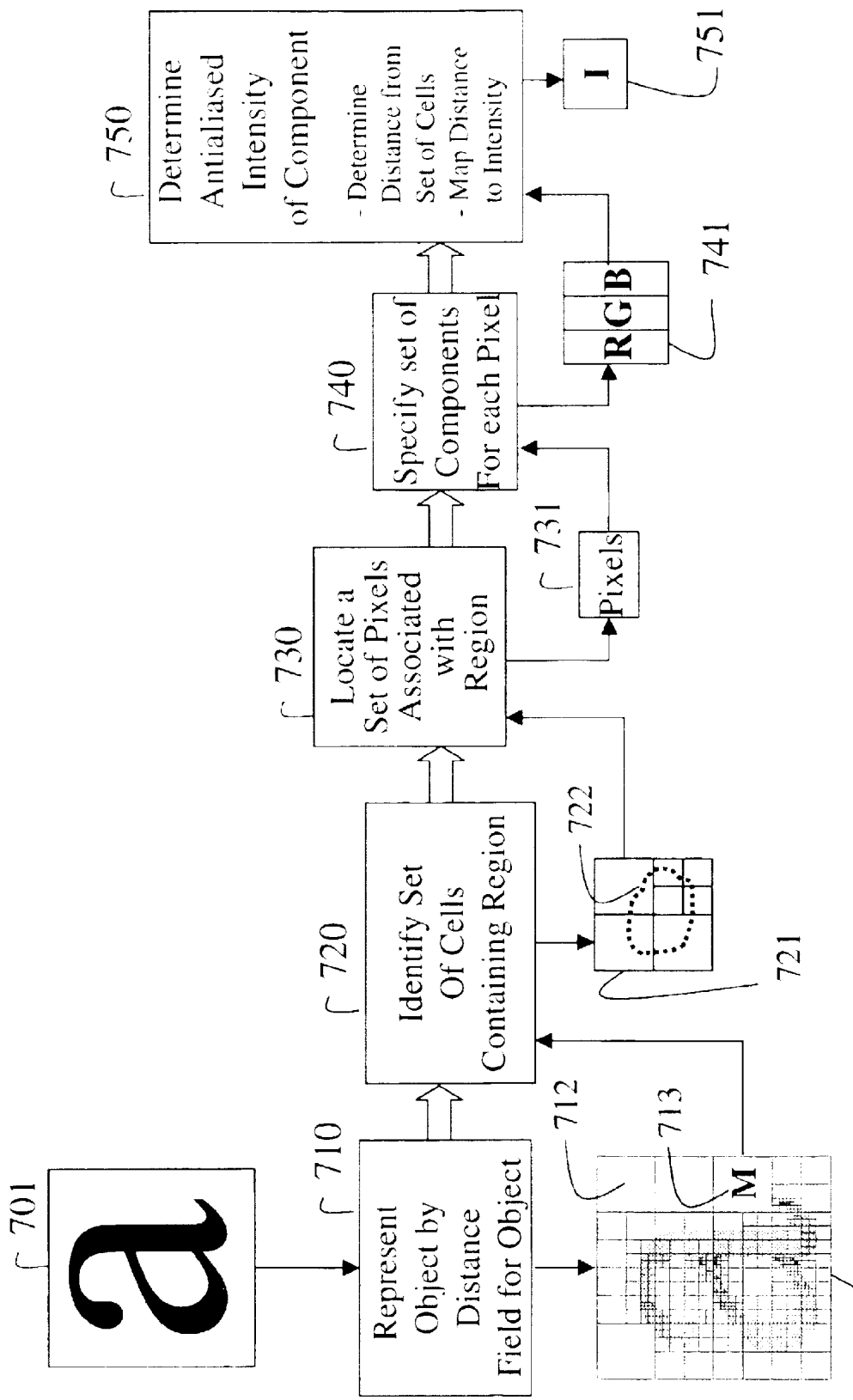
FIG. 7 is a flow diagram of a method for antialiasing an object in object-order according to the invention.

FIG. 7 shows a method 700 for antialiasing an object 701, e.g., a glyph, represented 710 as a two-dimensional distance field 711 in object-order. The method 700 provides adaptive distance-based super sampling, distance-based automatic hinting, and distance-based grid fitting. The resulting antialiased pixel intensity can be rendered on CRT and LCD-like displays as part of an image. The method is particularly useful for rendering motion blur. We can use mipmapping when the cells of the two-dimensional distance fields 711 are organized in a spatial hierarchy to reduce the number of distance samples required.

The two-dimensional distance field 711 is partitioned into cells 712. In a preferred embodiment where we use bi-quadratic, adaptively sampled distance fields, the size of each cell is dependent on a local variance of the two-dimensional distance field. Each cell includes a method (M) 713 for reconstructing the two-dimensional distance field within the cell. A set of cells 721 containing a region (dashed line) 722 of the distance field to be rendered is identified 720.

The region 722 is used to locate 730 a set of pixels 731 associated with the region. A set of components 741 for each pixel in the set of pixels 731 is specified 740. Then, antialiased intensities 751 are determined 750 for each component of each pixel from distances in the set of cells. Here, the distances are reconstructed from the set of cells. The distances are then mapped to the antialiased intensity, as described above.

In one embodiment, we can determine the distance by locating a single sample point within the set of cells near the component of the pixel and reconstructing the distance at the single sample point from the set of cells. In our preferred embodiment where we use bi-quadratic adaptively sampled distance fields, this approach is augmented with a special treatment of cells smaller than the filter radius for adaptive distance-based supersampling. Because small cells occur where there is high variance in the distance field, distances in pixels near these cells can be pre-filtered before mapping the distances to intensity.

We initialize a compositing buffer of elements, where each element corresponds to a component of each pixel of the set of pixels. Each cell in the set of cells can be processed independently. In the preferred embodiment, each element consists of a weighted distance and an accumulated weight which are both initialized to zero. When a cell is processed, these weighted distances and accumulated weights are incremented in the buffer elements that correspond to pixel components which lie either within the cell or within a filter radius of the cell's center.

After processing all the cells, the weighted distances are normalized by the accumulated weight for each component of each pixel to produce the distance that is then mapped to the antialiased component intensity. In the preferred embodiment, we use the same Gaussian weights and filter radius as described above.

Our cell-based rendering described thus far always processes every leaf cell in the set of cells, regardless of the relative sizes of each cell to the filter radius. In theory, this provides optimal adaptive distance-based supersampling. In practice, the ADF quadtree can be used as a mipmap to reduce the number of cells.

The ADF quadtree structure allows us to replace small leaf cells with their ancestors, effectively truncating the quadtree at some predetermined cell size. As long as this cell size is less than or equal to ¼ of the inter-pixel spacing, there is no visual degradation in the adaptive distance-based supersampling results. This reduces the number of cells to render the region.

Processing Pixel Components

A pixel comprises one or more components. For example, pixels on a typical CRT or LCD color monitor comprise a red, a green, and a blue component. In our invention, when the pixel comprises a plurality of components, they can be treated independently, as described above, or processed as a single component. When the plurality of components is processed as a single component, a color and an alpha value of the pixel can be determined from the antialiased intensity of the single component.

There are two reasons to process the plurality of components as a single component. First, it reduces rendering times. Second, when the plurality of components cannot be addressed individually or when the relative positions of the individual components are not known, individual treatment of each component is not possible.

When display devices, such as LCDs, have addressable pixel components, it is known in the art that processing the plurality of components independently can increase the effective resolution of the device. Our invention can exploit this feature of such devices to provide distance-based antialiasing with superior quality over the prior art.

Animating Two-Dimensional Objects

Figure 12:
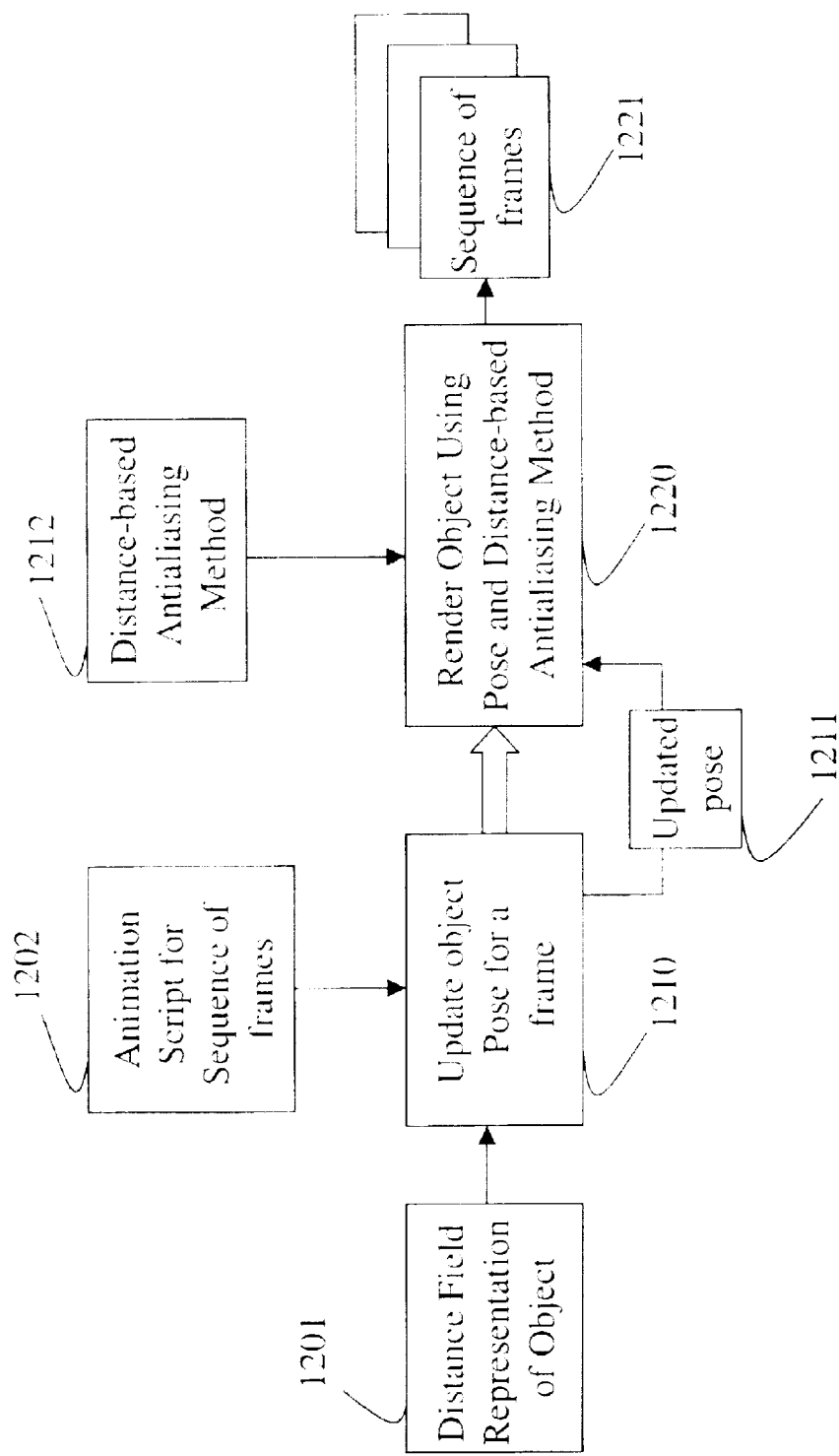
FIG. 12 is a flow diagram of a method for animating an object according to the invention.

FIG. 12 shows a flow diagram of a method 1200 for animating an object 1201 as a sequence of frames according to an animation script 1202. The animation script 1202 directs conditions of the object, e.g., the position, size, orientation, and deformation of the object, for each frame in the sequence of frames. The object is represented as a two-dimensional distance field. A pose 1211 of the object 1201 is updated 1210 for each frame in the sequence of frames 1221 according to the animation script 1202. The object 1201 is rendered using the updated pose 1211 and a distance-based antialiasing rendering method 1212.

The two-dimensional distance field representing the object 1201 can be acquired from a different representation of the object, e.g., an outline description of the object or a bitmap description of the object.

The updating 1210 of the pose 1211 for a particular object 1201 can be performed by applying various operations to the object including a rigid body transformation, a free-form deformation, a soft-body impact deformation, a level-set method, a particle simulation, and a change to its rendering attributes.

When rendering 1220 the object, we associate a set of sample points in the two-dimensional distance field representing the object with a component of a pixel in a frame in the sequence of frames 1221. By determining a distance from the two-dimensional distance field and the set of sample points, we can map the distance to an antialiased intensity of the component of the pixel.

In a preferred embodiment, we partition the two-dimensional distance field representing the object 1201 into cells, each cell including a method for reconstructing the two-dimensional distance field within the cell. To render 1220 in this instance, we identify a set of cells of the two-dimensional distance field representing the object 1201 that contains a region of the two-dimensional distance field to be rendered and locate a set of pixels associated with the region. A set of components for each pixel in the set of pixels is specified. A distance for each component of the pixel is determined from the set of cells and the distance is mapped to the antialiased intensity of the component of the pixel to determine an antialiased intensity for each component of each pixel in the set of pixels.

Distance-based Automatic Hinting

Hinting in standard font representations is a time-consuming manual process in which a type designer and hinting specialist generate a set of rules for better fitting individual glyphs to the pixel grid. Good hinting produces glyphs at small type sizes that are well spaced, have good contrast, and are uniform in appearance.

These rules provide: vertical stems with the same contrast distribution, with the left and bottom edges having the sharpest possible contrast; diagonal bars and thin, rounded parts of glyphs to have sufficient contrast for transmitting visual structure to the eye; and serifs that hold together and provide enough emphasis to be captured by the human eye, see Hersch et al., "Perceptually Tuned Generation of Grayscale Fonts," *IEEE CG&A*, Nov, pp. 78–89, 1995.

Note that prior art filtering methods produce fuzzy characters and assign different contrast profiles to different character parts, thus violating important rules of type design. To overcome these limitations, hints are developed for each glyph of each font. There are numerous problems with prior art hinting methods: they are labor intensive to develop, slow to render, and complex thus precluding hardware implementations.

For outline-based fonts, rendering with hints is a three step process. First, the glyph's outlines are scaled and aligned to the pixel grid. Second, the outlines are modified to control contrast of stems, bars, and serifs and to increase the thickness of very thin sections and arcs. Third, the modified outlines are supersampled followed by downsampling with filtering.

Although our unhinted distance-based antialiasing rendering methods described above compare favorably with prior art font rendering methods that use hinting, it is known that perceptual hinting can improve reading comfort at small type sizes.

Figure 8:
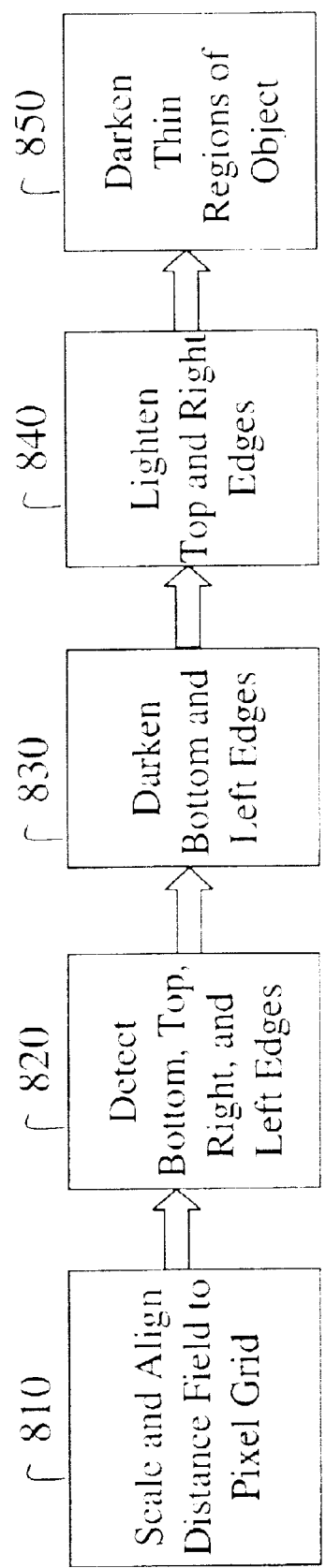
FIG. 8 is a flow diagram of a method for distance-based automatic hinting according to the invention.

Therefore, as shown in FIG. 8, we exploit the distance field to provide distance-based automatic hinting 800 for rendering glyphs at small point sizes. The first step 810 in hinting is to scale and align the distance field to the pixel grid. This can be done automatically from the given or derived font metrics, e.g., the cap-height, the x-height, and the position of the baseline.

After applying this form of grid fitting, we use the distance field and its gradient field to provide perceptual hints.

In one embodiment, the direction of the gradient of the distance field is used to detect 820 pixels on the left and bottom edges of the object. By darkening 830 these pixels and lightening 840 pixels on opposite edges, we achieve higher contrast on left and bottom edges without changing the apparent stroke weight. This can be done by decreasing and increasing the corresponding pixel intensities.

In another embodiment, the gradient field is used to provide better contrast for diagonal stems and thin arcs. We note that when a pixel is located on or near thin regions of the glyph, neighbors on either side of the pixel have opposite gradient directions, i.e., their dot products are negative. By detecting abrupt changes in gradient directions, we can darken 850 pixels on these thin regions.

These are only two examples of how the distance field can be used to provide perceptual hints automatically. The distance field can also be used to provide optimal character spacing and uniform stroke weight.

Generating and Editing Fonts

There are two basic methods for designing fonts. The first is manual. There, glyphs are drawn by hand, digitized, and then outlines are fit to the digitized bitmaps. The second is by computer.

In the latter case, three types of tools are available. Direct visual tools can be used for curve manipulation. Procedural design tools construct the shape of a glyph by executing the instructions of a procedure. The procedure defines either a shape's outline and fills it, or defines a path stroked by a pen nib with numerous attributes, including a geometry and an orientation. Component-based design tools allow designers to build basic components such as stems, arcs, and other recurring shapes, and then combine the components to generate glyphs.

We use a sculpting editor to provide stroke-based design. This is the 2D counterpart to 3D carving as described in U.S. patent application Ser. No. 09/810,261, "System and Method for Sculpting Digital Models," filed on Mar. 16, 2001, incorporated herein by reference. Stroking can be done interactively or it can be scripted to emulate programmable design tools.

Curve-based design, using Bezier curve manipulation tools similar to those in Adobe Illustrator can also be used. Curve-based design can be combined with methods for converting outlines to distance fields and distance fields to outlines to provide a seamless interface between design paradigms.

Component-based design uses CSG and blending operations on the implicit distance field. This allows components to be designed separately and combined either during editing or during rendering.

We also provide a method for automatically generating ADFs from analog and digital font masters.

For component-based design, our font editor provides the ability to efficiently reflect and rotate ADFs using quadtree manipulation to model the symmetries common in glyphs. Additional features include ADF scaling, translation, and operations to combine multiple ADFs, e.g., CSG and blending.

For stroke-based design, we provide carving tools with a geometric profile to emulate pen nibs. The orientation and size of the simulated pen nib can change along the stroke to mimic calligraphy.

Figure 9:
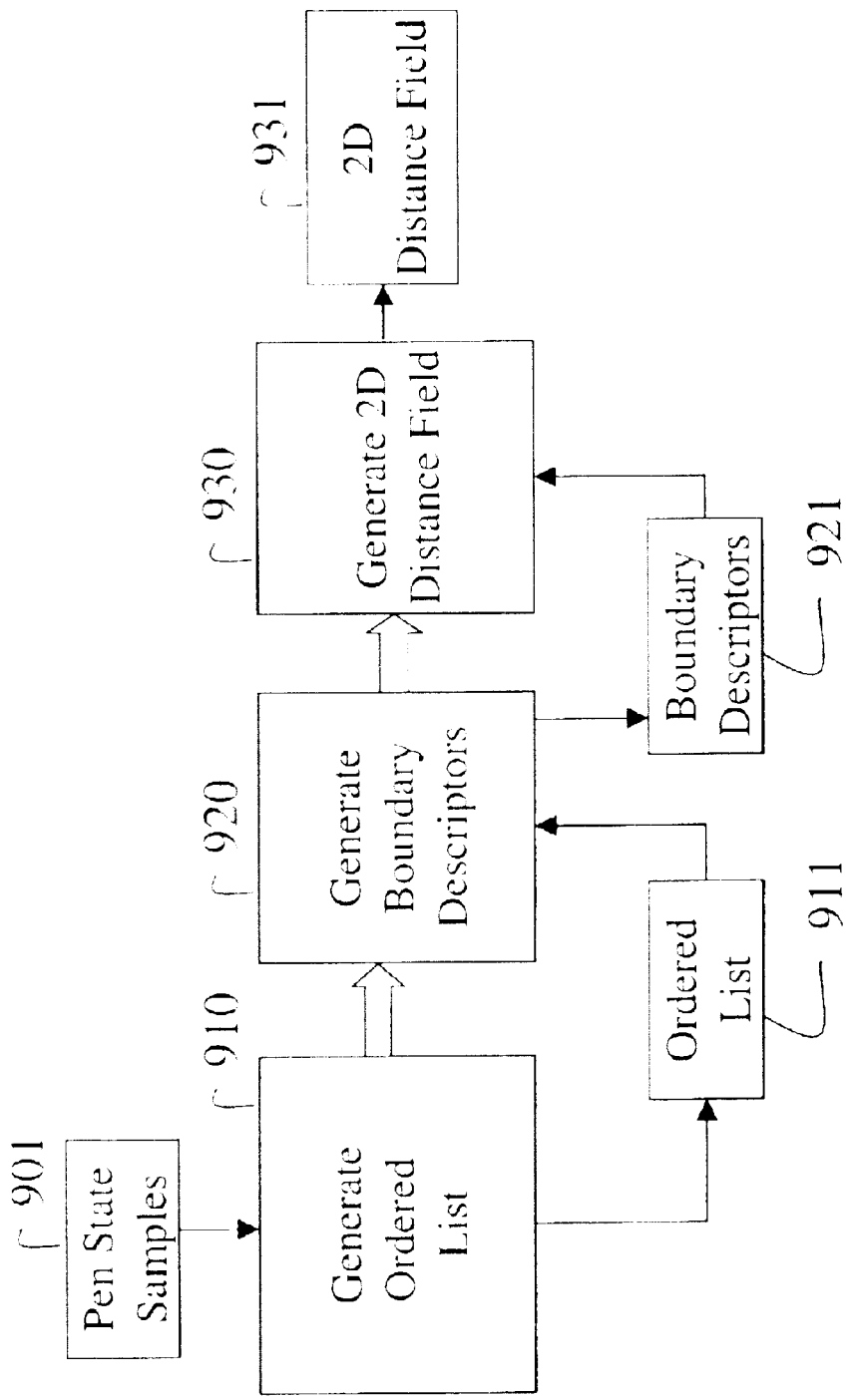
FIG. 9 is a flow diagram of a method for converting a pen stroke to a distance field according to the invention.

FIG. 9 shows a method 900 for generating a two-dimensional distance field 931 from a pen stroke. We sample a pen state during a pen stroke, the pen state comprising a location of the pen during the stroke. This pen state may also include orientation and geometry. From the pen state samples 901, we generate 910 an ordered list 911 of pen states along the pen stroke. Then, a set of boundary descriptors 921 is generated 920 from the ordered list of pen states. Finally, we generate 930 a two-dimensional distance field 931 from the set of boundary descriptors 921.

In the preferred embodiment, the boundary descriptors 921 are curves such as cubic Bezier curves.

In the preferred embodiment, we apply a curve fitting process to fit a minimum set of $G^2$ continuous curves to the path of the pen, with user-specified accuracy. We also generate two additional ordered lists of offset points from this path using the tool size and orientation, and fit curves to these offset points to generate the stroke outlines. The outline curves are placed in a spatial hierarchy for efficient processing. We generate a two-dimensional ADF from this hierarchy using a tiled generator, see U.S. patent application Ser. No. 09/810,983, filed on Mar. 16, 2001, and incorporated herein by reference.

The minimum distance to the outlines is computed efficiently using Bezier clipping. Strokes are converted to ADFs without a perceptual delay for the user. For curve manipulation, we provide a Bezier curve editor.

Figure 11:
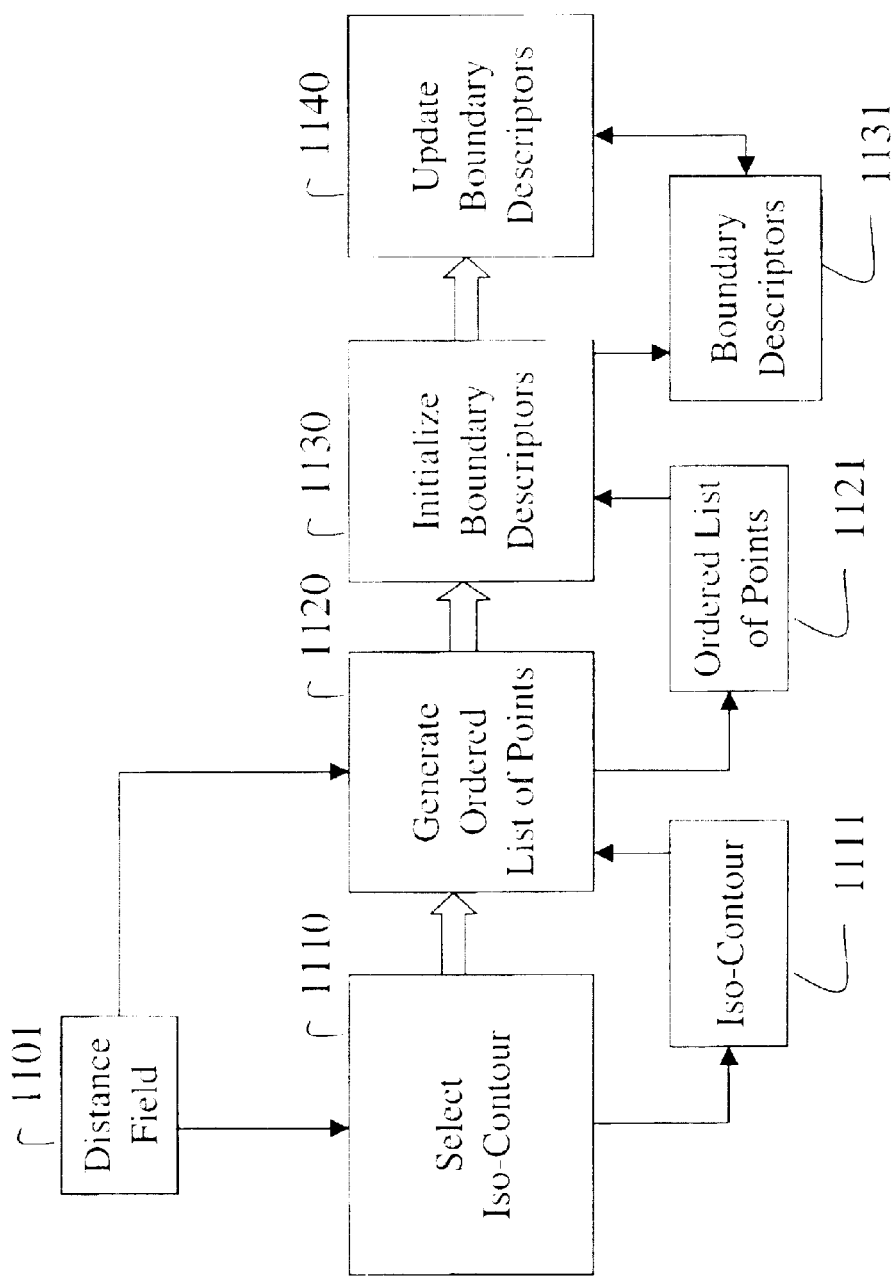
FIG. 11 is a flow diagram of a method for converting a distance field to boundary descriptors according to the invention.

As shown in FIG. 11, we also provide the ability to convert distance fields to boundary descriptors, e.g., Bezier curves, to provide a seamless interface between all three design paradigms.

In the preferred embodiment, we use bi-quadratic ADFs where this conversion traverses the leaf cells using the ADF hierarchy for fast neighbor searching, generates an ordered list of points along the zero-valued iso-contours of the ADF, and then fits curves as described with reference to FIG. 11, below, to generate the boundary descriptors.

In contrast with the prior art, where boundary descriptor errors are computed from the list of points, we compute the boundary descriptor error directly from the distance field. We pay special attention to sharp corners. Our approach is fast enough to allow users to seamlessly switch between paradigms without any noticeable delay.

FIG. 11 shows a method 1100 for converting a two-dimensional distance field 1101 to a set of boundary descriptors 1131. First, we select 1110 an iso-contour 1111 of the two-dimensional distance field 1101, e.g., distances with a zero value, or some offset.

Next, we generate 1120 an ordered list of points 1121 from the iso-contour 1111 and the two-dimensional distance field 1101. In our preferred embodiment using bi-quadratic adaptively sampled distance fields, this step visits neighboring cells of the adaptively sampled distance field 1101 sequentially using a neighbor searching technique. The search technique exploits a spatial hierarchy of the adaptively sampled distance field 1101 to efficiently localize a next neighbor along the iso-contour 1111.

In another embodiment, we generate 1120 an ordered list of points 1121 by selecting boundary cells in the ADF 1101, seeding each boundary cell with a set of ordered points, and moving each point to the iso-contour 1111 of the ADF 1101 using a distance field and a gradient field of the ADF 1101.

Then, we initialize 1130 a set of boundary descriptors 1131 to fit the ordered list of points 1121. The boundary descriptors 1131 are initialized 1130 by joining adjacent points of the ordered list of points 1121 to form a set of line segments that constitute the initial boundary descriptors 1131.

In another embodiment, we initialize 1130 a set of boundary descriptors 1131 by locating corner points, subdividing the ordered list of points into segments delimited by the corner points, and determining segment boundary descriptors to fit each segment. The union of the segment boundary descriptors forms the initial boundary descriptors 1131.

Corner points can be located by measuring curvature determined from the distance field. In the preferred embodiment, where the distance field is a bi-quadratic ADF, regions of high curvature are represented by small cells in the ADF and hence corner points can be located by using ADF cell sizes.

Once the boundary descriptors 1131 are initialized 1130, the boundary descriptors 1131 are updated 1140. The updating 1140 determines an error for each boundary descriptor by reconstructing the distance field and measuring the average or maximum deviation of the boundary descriptor from the iso-contour.

The boundary descriptors 1131 are updated 1140 until the error for each boundary descriptor is acceptable, or a predetermined amount of time has elapsed, or a cardinality of the set of boundary descriptors 1131 is minimal.

To incorporate the existing legacy of fonts stored in non-digital form, i.e., as analog masters, or in digital form as bitmaps, i.e., as digital masters, our editing system provides a method for generating ADFs from high-resolution bi-level bitmaps.

Analog masters are first scanned to produce bi-level digital masters at a resolution at least four times higher than the target ADF resolution, e.g., a 4096×4096 digital master is adequate for today's display resolutions and display sizes. An exact Euclidean distance transform is then applied to the bitmap to generate a regularly sampled distance field representing the glyph.

Then, we generate an ADF from this regularly sampled distance field using the tiled generator. Conversion from the bitmap to the ADF requires ~10 seconds per glyph on a 2 GHz Pentium IV processor.

To convert from existing prior art descriptors of glyphs to distance fields where the glyphs are described with a set of boundary descriptors, we apply the method described with reference to FIG. 10.

Computational Substrate for Kinetic Typography

The distance field and the spatial hierarchy attributes of our ADF glyph framework can also be used for computer simulation of 2D objects, e.g., glyphs, corporate logos, or any 2D shape. For example, both attributes can be used in collision detection and avoidance, for computing forces between interpenetrating bodies, and for modeling soft body deformation.

Level set methods, which use signed distance fields, can be used to model numerous effects such as melting and fluid dynamics. ADFs are a compact implicit representation that can be efficiently queried to compute distance values and gradients, two important computations required for the methods listed above.

In contrast, determining distance values and gradients from outlines that are moving or deforming is impractical in software for real-time interaction, see Hoff et al., "Fast and Simple 2D Geometric Proximity Queries Using Graphics Hardware," Proc. Interactive 3D Graphics'01, 2001. Hoff et al. use graphics hardware to generate a regularly sampled 2D distance field on the fly for deforming curves approximated by line segments.

The implicit nature of the distance field permits complex topological changes, such as surface offsets that would be difficult to model with outline-based fonts. In addition, distance fields can be used to provide non-photorealistic rendering of an animated object to add artistic effect.

Effect of the Invention

The invention provides a novel framework for representing, rendering, editing, and animating character glyphs, corporate logos, or any two-dimensional object. In a preferred embodiment, the invention uses two-dimensional bi-quadratic ADFs to represent two-dimensional objects. The bi-quadratic reconstruction method provides an optimal balance between memory use and computational load.

The invention includes a method for generating a two-dimensional distance field within a cell enclosing a corner of a two-dimensional object. This method provides a significant reduction in memory requirements and a significant improvement in accuracy over the prior art.

Our distance-based antialiasing rendering methods provide better antialiasing using a single unhinted distance sample per pixel than the supersampling methods used in the prior art.

Our distance-based methods exploit the spatial hierarchy of ADFs to provide efficient optimal adaptive distance-based supersampling resulting in superior spatial and temporal antialiasing. Our methods also provide a computational substrate for distance-based automatic hinting, for distance-based grid fitting, for unifying three common digital font design paradigms, and for generating a variety of special effects for kinetic typography.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for antialiasing a region of a two-dimensional distance field representing an object, wherein the two-dimensional distance field is partitioned into cells, each cell including a method for reconstructing the two-dimensional distance field within the cell, comprising:

identifying a set of cells of a two-dimensional distance field representing an object, the set of cells associated with a region of the two-dimensional distance field to be rendered;

locating a set of pixels associated with the region;

specifying a set of components for each pixel in the set of pixels; and determining an antialiased intensity for each component of each pixel in the set of pixels, the determining further comprising:

determining a distance for the component of the pixel from the set of cells; and mapping the distance to the antialiased intensity of the component of the pixel.

2. The method of claim 1 wherein the two-dimensional distance field is a two-dimensional distance map.

3. The method of claim 1 wherein the two-dimensional distance field is a two-dimensional distance shell.

4. The method of claim 1 wherein the two-dimensional distance field comprises a set of distances stored in a memory.

5. The method of claim 2, 3, or 4 wherein each cell of the two-dimensional distance field comprises a set of spatially related sampled distances and the method for reconstructing the two-dimensional distance field within the cell reconstructs the distance at a location within the cell from the sampled distances.

6. The method of claim 5 wherein the set of spatially related sampled distances are located at vertices of a quadrilateral and the method for reconstructing the two-dimensional distance field within the cell is bilinear interpolation.

7. The method of claim 5 wherein the method for reconstructing the two-dimensional distance field within the cell is bi-quadratic interpolation.

8. The method of claim 2, 3, or 4 wherein the method for reconstructing the two-dimensional distance field within each cell of the two-dimensional distance field is a procedure.

9. The method of claim 1 wherein the two-dimensional distance field is a two-dimensional adaptively sampled distance field.

10. The method of claim 1 wherein a union of the set of cells contains the region.

11. The method of claim 10 wherein the union includes other cells with centers within a specified distance from the region.

12. The method of claim 10 wherein the cells of the two-dimensional distance field are organized in a spatial hierarchy.

13. The method of claim 12 wherein each cell in the set of cells is a leaf cell in the spatial hierarchy.

14. The method of claim 12 wherein each cell in the set of cells has a size that is larger than a value determined from a distance between pixels in the set of pixels.

15. The method of claim 1 wherein the set of cells are located near the region.

16. The method of claim 1 wherein the set of pixels is located by transforming the region into an image space and determining image pixels within the transformed region.

17. The method of claim 1 wherein the image pixels are determined by rasterizing the transformed region.

18. The method of claim 1 wherein the region is an area determined from a subset of the cells of the two-dimensional distance field.

19. The method of claim 1 wherein the region is an area covered by a subset of the cells of the two-dimensional distance field.

20. The method of claim 1 wherein the specifying of the set of components for each pixel in the set of pixels is determined from characteristics of a display device comprising the set of pixels.

21. The method of claim 20 wherein the characteristics of the display device include a cardinality of the set of components for each pixel.

22. The method of claim 20 wherein the characteristics of the display device include a spatial layout of the set of components for each pixel.

23. The method of claim 20 wherein the characteristics of the display device include a descriptor for each component in the set of components for each pixel.

24. The method of claim 1 wherein the determining of the distance further comprises:

locating a single sample point within the set of cells near the component of the pixel; and reconstructing the distance at the single sample point from the set of cells.

25. The method of claim 1 wherein the determining of the distance further comprises:

initializing a compositing buffer of elements, each element corresponding to a component of each pixel of the set of pixels;

processing each cell in the set of cells independently, the processing of each cell updating a set of the elements in the compositing buffer; and processing each element in the compositing buffer to determine the distance of the corresponding component of each pixel of the set of pixels.

26. The method of claim 25 wherein each element of the compositing buffer includes a weighted distance.

27. The method of claim 25 wherein each element of the compositing buffer comprises an accumulated weight.

28. The method of claim 25 wherein the processing of each cell further comprises:

determining a set of pixel components for the cell, the set of pixel components being a subset of the sets of components for each pixel in the set of pixels;

reconstructing a sample distance from the cell corresponding to each pixel component in the set of pixel components;

determining a sample weight for each pixel component in the set of pixel components; and updating the element in the compositing buffer corresponding to each pixel component in the set of pixel components with the sample weight and the sample distance.

29. The method of claim 28 wherein the set of pixel components is determined by locating pixel components within the cell.

30. The method of claim 28 wherein the set of pixel components is determined by locating pixel components within a specified distance from a center of the cell.

31. The method of claim 28 wherein the updating accumulates the sample weight into an accumulated weight of the element in the compositing buffer.

32. The method of claim 28 wherein the updating accumulates the sample distance into a weighted distance of the element in the compositing buffer.

33. The method of claim 28 wherein the sample weight for a pixel component in the set of pixel components is a constant value.

34. The method of claim 28 wherein the sample weight for a pixel component in the set of pixel components is determined from a second distance derived from a location of the cell and a position of the pixel component.

35. The method of claim 34 wherein the sample weight for the pixel component is a linear function of the second distance.

36. The method of claim 34 wherein the sample weight for the pixel component is a Gaussian function of the second distance.

37. The method of claim 25 wherein the processing of each element in the compositing buffer further comprises:

determining a weighted average from a weighted distance and an accumulated weight of the element of the compositing buffer to determine the distance.

38. The method of claim 1 wherein the determining of the distance is an evaluation of an analytic function over an area of the two-dimensional distance field near the component of the pixel.

39. The method of claim 38 wherein the analytic function is an integral over the area of the two-dimensional distance field near the component of the pixel.

40. The method of claim 1 wherein the mapping is a one-dimensional function relating the distance to the antialiased intensity.

41. The method of claim 40 wherein the one-dimensional function is a composition of a first function and a second function.

42. The method of claim 41 wherein the second function is a contrast enhancement function.

43. The method of claim 40 wherein the one-dimensional function is linear.

44. The method of claim 40 wherein the one-dimensional function is Gaussian.

45. The method of claim 40 wherein the one-dimensional function determines a stroke weight of the object.

46. The method of claim 40 wherein the one-dimensional function determines an edge contrast of the object.

47. The method of claim 1 wherein the mapping is a one-dimensional lookup table relating the distance to the antialiased intensity.

48. The method of claim 47 wherein each antialiased intensity value in the one-dimensional lookup table is a linear function of the distance.

49. The method of claim 47 wherein each antialiased intensity value in the one-dimensional lookup table is a Gaussian function of the distance.

50. The method of claim 47 wherein the one-dimensional lookup table determines a stroke weight of the object.

51. The method of claim 47 wherein the one-dimensional lookup table determines an edge contrast of the object.

52. The method of claim 1 wherein the mapping is an N-dimensional function relating the distance to the antialiased intensity.

53. The method of claim 52 wherein an argument of the N-dimensional function is determined from a position of the component of the pixel.

54. The method of claim 52 wherein an argument of the N-dimensional function is determined from a gradient field of the two-dimensional distance field near the component of the pixel.

55. The method of claim 52 wherein an argument of the N-dimensional function is a stroke weight of the object.

56. The method of claim 52 wherein the N-dimensional function determines a stroke weight of the object.

57. The method of claim 52 wherein an argument of the N-dimensional function is an edge contrast of the object.

58. The method of claim 52 wherein the N-dimensional function determines an edge contrast of the object.

59. The method of claim 52 wherein an argument of the N-dimensional function is a characteristic of the component of the pixel.

60. The method of claim 52 wherein an argument of the N-dimensional function is a position of the component of the pixel.

61. The method of claim 1 wherein the mapping is an N-dimensional lookup table relating the distance to the antialiased intensity.

62. The method of claim 61 wherein an argument of the N-dimensional lookup table is determined from a position of the component of the pixel.

63. The method of claim 61 wherein an argument of the N-dimensional lookup table is determined from a gradient field of the two-dimensional distance field near the component of the pixel.

64. The method of claim 61 wherein an argument of the N-dimensional lookup table is a stroke weight of the object.

65. The method of claim 61 wherein the N-dimensional lookup table determines a stroke weight of the object.

66. The method of claim 45, 50, 56, or 65 wherein a position of a second object is adjusted according to the stroke weight of the object.

67. The method of claim 61 wherein an argument of the N-dimensional lookup table is an edge contrast of the object.

68. The method of claim 61 wherein the N-dimensional lookup table determines an edge contrast of the object.

69. The method of claim 61 wherein an argument of the N-dimensional lookup table is a characteristic of the component of the pixel.

70. The method of claim 59 or 69 wherein the characteristic of the component of the pixel is brightness.

71. The method of claim 59 or 69 wherein the characteristic of the component of the pixel is color.

72. The method of claim 61 wherein an argument of the N-dimensional lookup table is a position of the component of the pixel.

73. The method of claim 1 wherein the pixel consists of a single component.

74. The method of claim 73 wherein a color of the pixel is determined from the antialiased intensity of the single component of the pixel.

75. The method of claim 73 wherein a color and an alpha value of the pixel are determined from the antialiased intensity of the single component of the pixel.

76. The method of claim 1 wherein the pixel consists of M components.

77. The method of claim 76 wherein the M components are processed as a single component.

78. The method of claim 73 or 77 wherein a color of the pixel is determined by using the antialiased intensity of the single component of the pixel.

79. The method of claim 76 wherein positions of the M components are predetermined and a set of the M components is processed independently.

80. The method of claim 79 wherein a color of the pixel is determined from the antialiased intensities of the components in the set of the M components.

81. The method of claim 79 wherein a color and an alpha value of the pixel are determined from the antialiased intensities of the components in the set of the M components.

82. The method of claim 79 wherein a color of the pixel is determined by using the antialiased intensity of each component of the pixel.

83. The method of claim 76 wherein the M components comprise a red, a green, and a blue component.

84. The method of claim 76 wherein the M components comprise a cyan, a magenta, a yellow, and a black component.

85. The method of claim 76 wherein the M components have different characteristics.

86. The method of claim 76 wherein positions of the M components are predetermined.

87. The method of claim 1 wherein the distance is modified by an N-dimensional function where one argument of the function is a gradient field of the two-dimensional distance field near the component of the pixel.

88. The method of claim 1 wherein the antialiased intensity of the component of the pixel is modified by an N-dimensional function where one argument of the function is a gradient field of the two-dimensional distance field near the component of the pixel.

89. The method of claim 54, 63, 87, or 88 wherein the gradient field provides automatic hinting of the object.

90. The method of claim 89 wherein the object is a character glyph.

91. The method of claim 89 wherein the object is a logo.

92. The method of claim 89 wherein a direction of the gradient field is used to increase contrast on selected edges of the object.

93. The method of claim 92 wherein the selected edges are left edges and bottom edges of the object.

94. The method of claim 89 wherein the gradient field is used to reduce dropout near thin regions of the object.

95. The method of claim 94 wherein abrupt changes in a direction of the gradient field are used to detect the thin regions of the object.

96. The method of claim 54, 63, 87, or 88 wherein the gradient field is used to render motion blur of the object.

97. The method of claim 96 wherein a similarity between a direction of the gradient field and a direction of motion of the object are used to render the motion blur of the object.

98. The method of claim 1 wherein the object is a two-dimensional character glyph and the two-dimensional distance field includes a set of attributes, further comprising:
modifying the two-dimensional distance field according to the set of attributes.

99. The method of claim 98 wherein an attribute in the set of attributes is a stroke weight of the two-dimensional character glyph.

100. The method of claim 98 wherein an attribute in the set of attributes is a baseline of the two-dimensional character glyph.

101. The method of claim 100 wherein the baseline is determined from the two-dimensional distance field.

102. The method of claim 98 wherein the modifying scales the two-dimensional distance field.

103. The method of claim 98 the modifying translates the two-dimensional distance field.

104. The method of claim 98 wherein the modifying deforms the two-dimensional distance field.

105. The method of claim 98 wherein a plurality of two dimensional distance fields representing a plurality of two-dimensional character glyphs includes a single set of attributes.

106. The method of claim 105 wherein an attribute in the single set of attributes is a baseline of the two-dimensional character glyphs determined from the two-dimensional distance fields.

107. The method of claim 105 wherein an attribute in the single set of attributes is a cap-height of the two-dimensional character glyphs determined from the two-dimensional distance fields.

108. The method of claim 105 wherein an attribute in the single set of attributes is an x-height of the two-dimensional character glyphs determined from the two-dimensional distance fields.

109. The method of claim 98 wherein an attribute in the set of attributes is an edge of the two-dimensional glyph.

110. The method of claim 109 wherein the edge is determined from the two-dimensional distance field.

111. The method of claim 98 wherein an attribute in the set of attributes is a cap-height of the two-dimensional glyph.

112. The method of claim 111 wherein the cap-height is determined from the two-dimensional distance field.

113. The method of claim 98 wherein an attribute in the set of attributes is an x-height of the two-dimensional glyph.

114. The method of claim 113 wherein the x-height is determined from the two-dimensional distance field.

115. The method of claim 98 wherein an attribute in the set of attributes is a size of the component of the pixel.

116. The method of claim 98 wherein an attribute in the set of attributes is a characteristic of the component of the pixel.

117. The method of claim 98 wherein an attribute in the set of attributes is a position of the component of the pixel.

118. The method of claim 117 wherein the modifying aligns the two-dimensional distance field to the position of the component of the pixel.

119. The method of claim 118 wherein the mapping is an N-dimensional function relating the distance to the antialiased intensity, the N-dimensional function is an attribute in the set of attributes, and the N-dimensional function determines the alignment.

120. The method claim 118 wherein the mapping is an N-dimensional lookup table relating the distance to the antialiased intensity, the N-dimensional lookup table is an attribute in the set of attributes, and the N-dimensional lookup table determines the alignment.

121. The method of claim 98 wherein an attribute in the set of attributes is a position of the pixel.

122. The method of claim 98 wherein the modifying aligns the two-dimensional distance field to a pixel grid.

123. The method of claim 122 wherein the mapping is an N-dimensional function relating the distance to the antialiased intensity, the N-dimensional function is an attribute in the set of attributes, and the N-dimensional function determines the alignment.

124. The method of claim 122 wherein the mapping is an N-dimensional lookup table relating the distance to the antialiased intensity, the N-dimensional lookup table is an attribute in the set of attributes, and the N-dimensional lookup table determines the alignment.

125. The method of claim 98 wherein the mapping is an N-dimensional function relating the distance to the antialiased intensity and the N-dimensional function is an attribute in the set of attributes.

126. The method of claim 98 wherein the mapping is an N-dimensional lookup table relating the distance to the antialiased intensity and the N-dimensional lookup table is an attribute in the set of attributes.

127. An apparatus for antialiasing a region of a two-dimensional distance field representing an object, wherein the two-dimensional distance field is partitioned into cells, each cell including a method for reconstructing the two-dimensional distance field within the cell, comprising:
a means for identifying a set of cells of a two-dimensional distance field representing an object, the set of cells associated with a region of the two-dimensional distance field to be rendered;
a means for locating a set of pixels associated with the region;
a means for specifying a set of components for each pixel in the set of pixels;
a means for determining an antialiased intensity for each component of each pixel in the set of pixels, the determining further comprising:
a means for determining a distance for the component of the pixel from the set of cells; and
a means for mapping the distance to the antialiased intensity of the component of the pixel; and
a display device for displaying the antialiased intensity of the component of the pixel.

128. The apparatus of claim 127 wherein the display device is a CRT monitor.

129. The apparatus of claim 127 wherein the display device is an LCD monitor.

130. The apparatus of claim 127 wherein the display device is a part of a personal digital assistant.

131. The apparatus of claim 127 wherein the display device is a part of a communication device.

132. The apparatus of claim 127 wherein the display device is a part of a gaming device.

133. The apparatus of claim 127 wherein the display device is a part of an appliance.

134. The apparatus of claim 127 wherein the display device is a part of an electronic device.

* * * * *